(12) United States Patent
Xu et al.

(10) Patent No.: US 11,493,733 B2
(45) Date of Patent: Nov. 8, 2022

(54) OPTICAL IMAGING LENS ASSEMBLY

(71) Applicant: ZHEJIANG SUNNY OPTICAL CO., LTD., Ningbo (CN)

(72) Inventors: Biao Xu, Ningbo (CN); Kaiyuan Zhang, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 356 days.

(21) Appl. No.: 16/744,957

(22) Filed: Jan. 16, 2020

(65) Prior Publication Data

US 2020/0201002 A1 Jun. 25, 2020

Related U.S. Application Data

(63) Continuation of application No. PCT/CN2018/116311, filed on Nov. 20, 2018.

(30) Foreign Application Priority Data

Nov. 22, 2017 (CN) .......................... 201711171315.2

(51) Int. Cl.
*G02B 9/64* (2006.01)
*G02B 13/00* (2006.01)
*G02B 13/06* (2006.01)

(52) U.S. Cl.
CPC ........... *G02B 9/64* (2013.01); *G02B 13/0045* (2013.01); *G02B 13/06* (2013.01)

(58) Field of Classification Search
None
See application file for complete search history.

(56) References Cited

U.S. PATENT DOCUMENTS 4,057,328 A 11/1977 Matsubara
5,130,850 A * 7/1992 Toide .................... G02B 13/18
359/708

(Continued)

FOREIGN PATENT DOCUMENTS

CN 104808315 A 7/2015
CN 104808332 A 7/2015

(Continued)

OTHER PUBLICATIONS

Examination Report issued in corresponding Indian Patent Application No. 201917054561; dated Jul. 9, 2021; 6 pgs.

(Continued)

*Primary Examiner* — Darryl J Collins
(74) *Attorney, Agent, or Firm* — Hauptman Ham, LLP

(57) ABSTRACT

The present disclosure discloses an optical imaging lens assembly including, sequentially from an object side to an image side along an optical axis, a first lens, a second lens, a third lens, a fourth lens, a fifth lens, a sixth lens, a seventh lens and an eighth lens. The first lens has a positive refractive power; the second lens has a negative refractive power; the third lens has a positive or negative refractive power; the fourth lens has a positive refractive power, an object-side surface thereof is a convex surface, and an image-side surface thereof is a convex surface; the fifth lens has a positive or negative refractive power, and an image-side surface thereof is a concave surface; the sixth lens has a positive or negative refractive power; the seventh lens has a positive refractive power; and the eighth lens has a negative refractive power.

18 Claims, 18 Drawing Sheets

(56) References Cited

U.S. PATENT DOCUMENTS

| | | | | |
|---|---|---|---|---|
| 5,212,597 | A * | 5/1993 | Yamada | G02B 13/16 |
| | | | | 359/708 |
| 2013/0155527 | A1 * | 6/2013 | Yoneyama | G02B 13/02 |
| | | | | 359/745 |
| 2017/0045714 | A1 * | 2/2017 | Huang | G02B 9/64 |
| 2017/0059832 | A1 * | 3/2017 | Yoshinaga | G02B 13/26 |
| 2018/0180856 | A1 * | 6/2018 | Jung | G02B 13/0045 |

FOREIGN PATENT DOCUMENTS

| | | |
|---|---|---|
| CN | 104898259 A | 9/2015 |
| CN | 104932086 A | 9/2015 |
| CN | 105278085 A | 1/2016 |
| CN | 106443986 A | 2/2017 |
| CN | 106443987 A | 2/2017 |
| CN | 106896473 A | 6/2017 |
| CN | 106950682 A | 7/2017 |
| CN | 107085285 A | 8/2017 |
| CN | 107703609 A | 2/2018 |
| JP | 2000089108 A | 3/2000 |
| TW | I525338 B | 3/2016 |

OTHER PUBLICATIONS

International Search Report from corresponding International Application No. PCT/CN2018/116311, dated Jan. 31, 2019, pp. 1-4, National Intellectual Property Administration, PRC, Beijing, China.

* cited by examiner

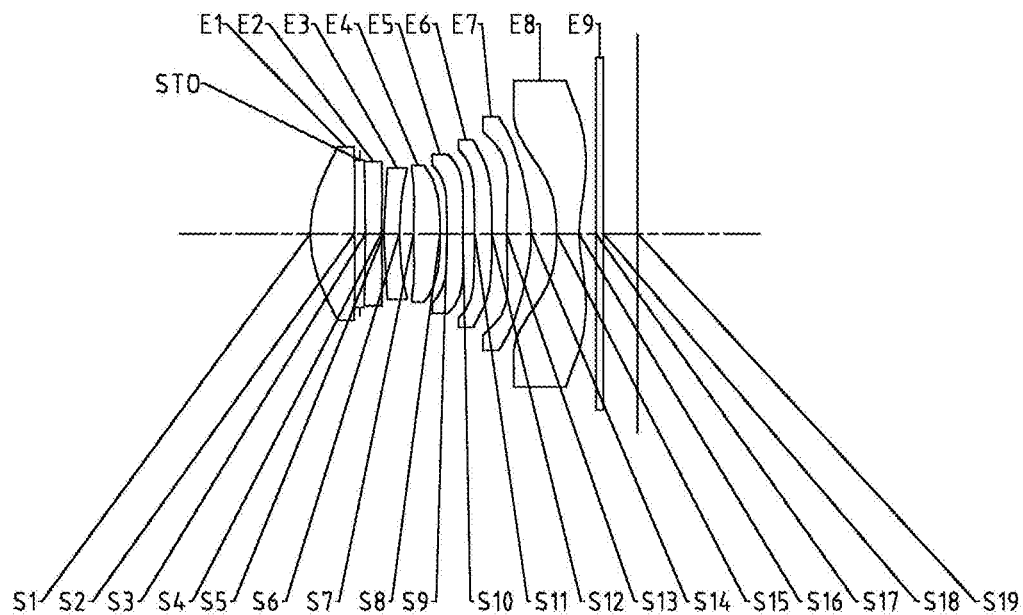
Fig. 13
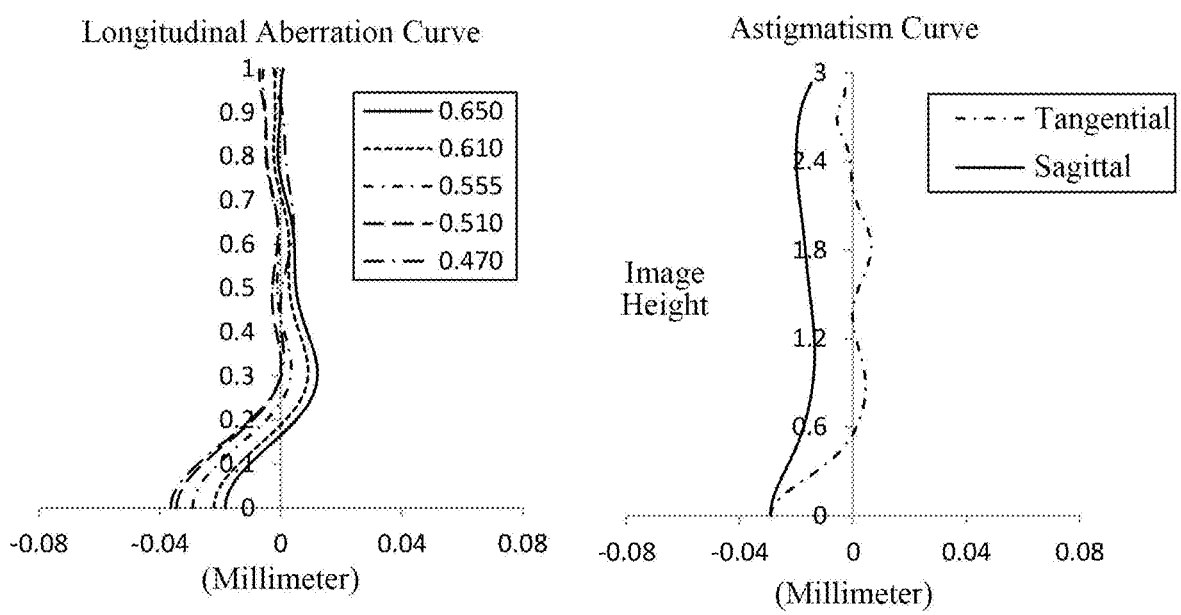
Fig. 14A
Fig. 14B

OPTICAL IMAGING LENS ASSEMBLY

CROSS-REFERENCE TO RELATED APPLICATION

The present patent application is a continuation of International Application No. PCT/CN2018/116311, filed on Nov. 20, 2018, which claims priority to Chinese Patent Application No. 201711171315.2, filed in the China National Intellectual Property Administration (CNIPA) on Nov. 22, 2017. Both of the aforementioned patent applications are hereby incorporated by reference in their entireties.

TECHNICAL FIELD

The present disclosure relates to an optical imaging lens assembly, and more specifically, relates to an optical imaging lens assembly including eight lenses.

BACKGROUND

In recent years, with the rapid development of science and technology, imaging lens assemblies applicable for portable electronic products are changing with each passing day, and people have higher and higher requirements for the imaging quality of imaging lenses assembly. However, as the portable electronic products are trending toward miniaturization, the requirements for the total length of imaging lenses assembly are becoming more and more stringent, which in turn cause the design freedom of the lenses assembly reduce, and the design difficulty increase.

At the same time, with the improvement of image sensors such as Charge Coupled Device (CCD) or Complementary Metal-Oxide Semiconductor (CMOS) and the reduce of the size thereof, higher requirements are placed on the corresponding imaging lens assemblies. The imaging lens assemblies are required to meet the miniaturization while having a high imaging quality.

SUMMARY

The present disclosure provides an optical imaging lens assembly that is applicable to portable electronic products and at least solves or partially addresses at least one of the above disadvantages of the prior art.

In one aspect, the present disclosure discloses an optical imaging lens assembly which includes, sequentially from an object side to an image side along an optical axis, a first lens, a second lens, a third lens, a fourth lens, a fifth lens, a sixth lens, a seventh lens and an eighth lens. The first lens may have a positive refractive power; the second lens may have a negative refractive power; the third lens has a positive refractive power or a negative refractive power; the fourth lens has a positive refractive power or a negative refractive power, an object-side surface thereof may be a convex surface, and an image-side surface thereof may be a convex surface; the fifth lens has a positive refractive power or a negative refractive power, and an image-side surface thereof may be a concave surface; the sixth lens has a positive refractive power or a negative refractive power; the seventh lens may have a positive refractive power; and the eighth lens may have a negative refractive power.

In one embodiment, a total effective focal length f of the optical imaging lens assembly and an entrance pupil diameter EPD of the optical imaging lens assembly may satisfy $f/EPD \leq 2.0$.

In one embodiment, a distance TTL on the optical axis from a center of an object-side surface of the first lens to an imaging plane of the optical imaging lens assembly and half of a diagonal length ImgH of an effective pixel area on the imaging plane of the optical imaging lens assembly may satisfy $TTL/ImgH \leq 1.70$.

In one embodiment, a full field-of-view FOV of the optical imaging lens assembly may satisfy $70° \leq FOV \leq 80°$.

In one embodiment, an effective focal length f1 of the first lens and a total effective focal length f of the optical imaging lens assembly may satisfy $0.5 < f1/f < 1.5$.

In one embodiment, a total effective focal length f of the optical imaging lens assembly and an effective focal length f2 of the second lens may satisfy $-0.5 < f/f2 < 0$.

In one embodiment, an effective focal length f7 of the seventh lens and an effective focal length f8 of the eighth lens may satisfy $-2.0 < f7/f8 < -1.0$.

In one embodiment, a radius of curvature R8 of the image-side surface of the fourth lens and a radius of curvature R7 of the object-side surface of the fourth lens may satisfy $-2.5 < R8/R7 < -0.5$.

In one embodiment, a center thickness CT4 of the fourth lens on the optical axis and a center thickness CT5 of the fifth lens on the optical axis may satisfy $1.0 < CT4/CT5 < 2.5$.

In one embodiment, a total effective focal length f of the optical imaging lens assembly and a radius of curvature R10 of the image-side surface of the fifth lens may satisfy $0 < f/R10 < 1.0$.

In one embodiment, a spaced distance T67 between the sixth lens and the seventh lens on the optical axis and a spaced distance T78 between the seventh lens and the eighth lens on the optical axis may satisfy $0 < T67/T78 < 1.0$.

In one embodiment, a radius of curvature R6 of an image-side surface of the third lens and a radius of curvature R5 of an object-side surface of the third lens satisfy $0 < R6/R5 < 1.5$.

In one embodiment, an effective focal length f1 of the first lens and a radius of curvature R1 of an object-side surface of the first lens may satisfy $1.5 < f1/R1 < 2.5$.

In one embodiment, a total effective focal length f of the optical imaging lens assembly and a center thickness CT6 of the sixth lens on the optical axis may satisfy $13.0 < f/CT6 < 17.0$.

In another aspect, the present disclosure also discloses an optical imaging lens assembly which includes, sequentially from an object side to an image side along an optical axis, a first lens, a second lens, a third lens, a fourth lens, a fifth lens, a sixth lens, a seventh lens and an eighth lens. The first lens may have a positive refractive power; the second lens may have a negative refractive power; each of the third lens, the fifth lens and the sixth lens has a positive refractive power or a negative refractive power; the fourth lens has a positive refractive power or a negative refractive power, an object-side surface thereof may be a convex surface, and an image-side surface thereof may be a convex surface; the seventh lens may have a positive refractive power; and the eighth lens may have a negative refractive power. Here, a total effective focal length f of the optical imaging lens assembly and an entrance pupil diameter EPD of the optical imaging lens assembly may satisfy $f/EPD \leq 2.0$.

In one embodiment, an object-side surface of the third lens may be a convex surface, and an image-side surface of the third lens may be a concave surface.

In one embodiment, an image-side surface of the fifth lens may be a concave surface.

In yet another aspect, the present disclosure also discloses an optical imaging lens assembly which includes, sequentially from an object side to an image side along an optical axis, a first lens, a second lens, a third lens, a fourth lens, a fifth lens, a sixth lens, a seventh lens and an eighth lens. The first lens may have a positive refractive power; the second lens may have a negative refractive power; each of the third lens, the fifth lens and the sixth lens has a positive refractive power or a negative refractive power; the fourth lens has a positive refractive power or a negative refractive power, an object-side surface thereof may be a convex surface, and an image-side surface thereof may be a convex surface; the seventh lens may have a positive refractive power; and the eighth lens may have a negative refractive power. Here, a total effective focal length f of the optical imaging lens assembly and a radius of curvature R10 of an image-side surface of the fifth lens may satisfy 0<f/R10<1.0.

The present disclosure employs a plurality of (for example, eight) lenses, and the optical imaging lens assembly has at least one advantageous effect such as miniaturization, large aperture, large field of view and high image quality and the like by rationally assigning the refractive power, the surface shape, the center thickness of each lens, and the axial spaced distance between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIG. 13 illustrates a schematic structural view of an optical imaging lens assembly according to Example 7 of the present disclosure;

FIGS. 14A to 14D illustrate a longitudinal aberration curve, an astigmatic curve, a distortion curve and a lateral color curve of the optical imaging lens assembly of the Example 7, respectively;

DETAILED DESCRIPTION OF EMBODIMENTS

Figure 1:
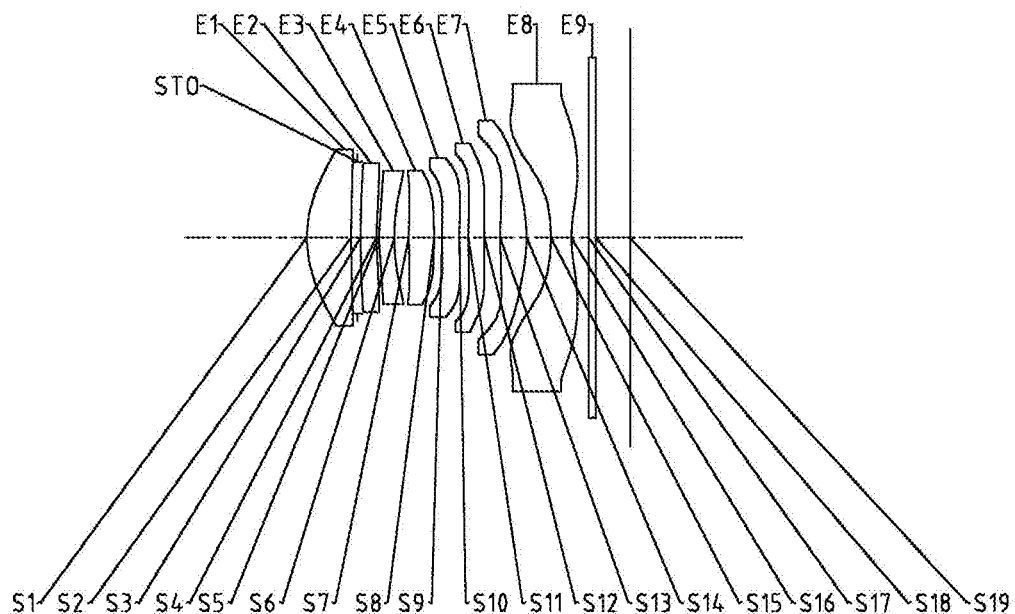
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object side is referred to as an object-side surface, and the surface closest to the imaging plane is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, eight lenses having refractive power, i.e. a first lens, a second lens, a third lens, a fourth lens, a fifth lens, a sixth lens, a seventh lens and an eighth lens. The eight lenses are arranged sequentially from an object side to an image side along an optical axis.

In an exemplary embodiment, the first lens may have a positive refractive power; the second lens may have a negative refractive power; the third lens has a positive refractive power or a negative refractive power; the fourth lens has a positive refractive power or a negative refractive power, an object-side surface thereof may be a convex surface, and an image-side surface thereof may be a convex surface; the fifth lens has a positive refractive power or a negative refractive power, and an image-side surface thereof is a concave surface; the sixth lens has a positive refractive power or a negative refractive power; the seventh lens may have a positive refractive power; and the eighth lens may have a negative refractive power. By reasonably assigning the positive or negative refractive power of each lens in the system, the low-order aberration of the imaging system may be effectively compensated, and the tolerance sensitivity of the imaging system is reduced, which in turn advantageously ensures the miniaturization of the imaging system.

In an exemplary embodiment, at least one of an object-side surface and an image-side surface of the first lens may be a convex surface, for example, the object-side surface of the first lens may be a convex surface.

In an exemplary embodiment, an object-side surface of the third lens may be a convex surface, and an image-side surface of the third lens may be a concave surface.

In an exemplary embodiment, the fourth lens may have a positive refractive power.

In an exemplary embodiment, at least one of an object-side surface and an image-side surface of the seventh lens may be a convex surface, for example, the image-side surface of the seventh lens may be a convex surface.

In an exemplary embodiment, an object-side surface of the eighth lens may be a concave surface, and an image-side surface of the eighth lens may be a concave surface.

In an exemplary embodiment, the optical imaging lens assembly according to the present disclosure may satisfy: f/EPD≤2.0, where f is a total effective focal length of the optical imaging lens assembly, and EPD is an entrance pupil diameter of the optical imaging lens assembly. More specifically, f and EPD may further satisfy: 1.61≤f/EPD≤1.93. Satisfying the conditional expression f/EPD≤2.0 is advantageous to increase the amount of light per unit time, so that the optical imaging lens assembly has a large aperture advantage. Thereby, it is possible to improve the imaging effect in the dark environment while reducing the aberration at edge field of view.

In an exemplary embodiment, the optical imaging lens assembly according to the present disclosure may satisfy: TTL/ImgH≤1.70, where TTL is a distance on the optical axis from a center of an object-side surface of the first lens to an imaging plane of the optical imaging lens assembly and ImgH is half of a diagonal length of an effective pixel area on the imaging plane of the optical imaging lens assembly. More specifically, TTL and ImgH may further satisfy: 1.47≤TTL/ImgH≤1.66. By controlling the ratio of TTL to ImgH, the longitudinal size of the imaging system is effectively compressed and the ultra-thin feature of the lens assembly is ensured to meet the needs of miniaturization.

In an exemplary embodiment, the optical imaging lens assembly according to the present disclosure may satisfy: 70°≤FOV≤80°, where FOV is a full field-of-view of the optical imaging lens assembly. More specifically, FOV may further satisfy: 70.6°≤FOV≤78.2°. By controlling the full field-of-view of the lens assembly, the imaging range of the lens assembly is effectively controlled.

In an exemplary embodiment, the optical imaging lens assembly according to the present disclosure may satisfy: 0.5<f1/f<1.5, where f1 is an effective focal length of the first lens and f is a total effective focal length of the optical imaging lens assembly. More specifically, f1 and f may further satisfy: 0.85<f1/f<1.15, for example, 0.97≤f1/f≤1.07. By reasonably controlling the contribution rate of the refractive power of the first lens to the total refractive power of the imaging system, the deflection angle of the light may be reduced and the imaging quality of the imaging system may be improved.

In an exemplary embodiment, the optical imaging lens assembly according to the present disclosure may satisfy: $-0.5<f/f2<0$, where f is a total effective focal length of the optical imaging lens assembly and f2 is an effective focal length of the second lens. More specifically, f and f2 may further satisfy: $-0.46 \le f/f2 \le -0.03$. Reasonably controlling the refractive power of the second lens may constrain the spherical aberration generated by the second lens within a reasonable range, thereby ensuring the imaging quality at the on-axis field-of-view area.

In an exemplary embodiment, the optical imaging lens assembly according to the present disclosure may satisfy: $-2.0<f7/f8<-1.0$, where f7 is an effective focal length of the seventh lens and f8 is an effective focal length of the eighth lens. More specifically, f7 and f8 may further satisfy: $-1.80<f7/f8<-1.30$, for example, $-1.66 \le f7/f8 \le 1.41$. Reasonably controlling the refractive power of the seventh lens and the eighth lens makes the effective focal length ratio of the seventh lens to the eighth lens within a certain range, which is beneficial for compensating the aberrations of the imaging system at an off-axis field-of-view area.

In an exemplary embodiment, the optical imaging lens assembly according to the present disclosure may satisfy: $-2.5<R8/R7<-0.5$, where R8 is a radius of curvature of the image-side surface of the fourth lens and R7 is a radius of curvature of the object-side surface of the fourth lens. More specifically, R8 and R7 may further satisfy: $-2.40<R8/R7<-0.90$, for example, $-2.35 \le R8/R7 \le -0.98$. Reasonably distributing the ratio of R8 to R7 may reduce the deflection angle of the light and make the imaging system achieve a better optical path deflection.

In an exemplary embodiment, the optical imaging lens assembly according to the present disclosure may satisfy: $1.0<CT4/CT5<2.5$, where CT4 is a center thickness of the fourth lens on the optical axis and CT5 is a center thickness of the fifth lens on the optical axis. More specifically, CT4 and CT5 may further satisfy: $1.20<CT4/CT5<2.20$, for example, $1.26 \le CT4/CT5 \le 2.08$. By controlling the ratio of CT4 to CT5, the distortion of the imaging system may be reasonably adjusted, which in turn makes the distortion of the imaging system within a reasonable range.

In an exemplary embodiment, the optical imaging lens assembly according to the present disclosure may satisfy: $0<f/R10<1.0$, where f is a total effective focal length of the optical imaging lens assembly and R10 is a radius of curvature of the image-side surface of the fifth lens. More specifically, f and R10 may further satisfy: $0.10<f/R10<0.60$, for example, $0.18 \le f/R10 \le 0.57$. By using the curvature radius of the image-side surface of the fifth lens, the contribution amount of the fifth lens to the high-order spherical aberration of the imaging system may be controlled to a certain degree, thereby making the imaging system have a good imaging quality.

In an exemplary embodiment, the optical imaging lens assembly according to the present disclosure may satisfy: $0<T67/T78<1.0$, where T67 is a spaced distance between the sixth lens and the seventh lens on the optical axis and T78 is a spaced distance between the seventh lens and the eighth lens on the optical axis. More specifically, T67 and T78 may further satisfy: $0.25<T67/T78<0.75$, for example, $0.31 \le T67/T78 \le 0.65$. By rationally controlling the ratio of T67 to T78, the field curvature of the system may be effectively controlled, which in turn make the imaging system has a better imaging quality at the off-axis field-of-view area.

In an exemplary embodiment, the optical imaging lens assembly according to the present disclosure may satisfy: $0<R6/R5<1.5$, where R6 is a radius of curvature of an image-side surface of the third lens and R5 is a radius of curvature of an object-side surface of the third lens. More specifically, R6 and R5 may further satisfy: $0.20<R6/R5<1.2$, for example, $0.32 \le R6/R5 \le 1.09$. By controlling the ratio of R6 to R5, the refractive power distribution of the third lens may be effectively controlled, so that the light may be better deflected at the third lens, thereby obtaining a better imaging effect.

In an exemplary embodiment, the optical imaging lens assembly according to the present disclosure may satisfy: $1.5<f1/R1<2.5$, where f1 is an effective focal length of the first lens and R1 is a radius of curvature of an object-side surface of the first lens. More specifically, f1 and R1 may further satisfy: $1.75<f1/R1<2.35$, for example, $1.83 \le f1/R1 \le 2.25$. By controlling the ratio of f1 to R1, the deflection of the incident light of the imaging system at the first lens may be effectively controlled, thereby reducing the sensitivity of the imaging system.

In an exemplary embodiment, the optical imaging lens assembly according to the present disclosure may satisfy: $13.0<f/CT6<17.0$, where f is a total effective focal length of the optical imaging lens assembly and CT6 is a center thickness of the sixth lens on the optical axis. More specifically, f and CT6 may further satisfy: $13.15 \le f/CT6 \le 16.95$. Reasonably controlling the ratio of f to CT6 may control the contribution amount of the sixth lens to the coma of the imaging system, so as to effectively compensate the coma produced by the front group lenses (that is, lenses between the object side and the sixth lens), thereby obtaining a good imaging quality.

In an exemplary embodiment, the optical imaging lens assembly described above may further include at least one diaphragm to improve the imaging quality of the lens assembly. The diaphragm may be disposed at any position as needed, for example, the diaphragm may be disposed between the first lens and the second lens.

Alternatively, the above optical imaging lens assembly may further include an optical filter for correcting the color deviation and/or a protective glass for protecting the photosensitive element on the imaging plane.

The optical imaging lens assembly according to the above embodiments of the present disclosure may employ a plurality of lenses, such as eight lenses as described above. By properly assigning the refractive power of each lens, the surface shape, the center thickness of each lens, and spaced distances on the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. In addition, the optical imaging lens assembly configured as described above also has advantageous effects such as large aperture, large field of view, high image quality, and the like.

In the embodiments of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging may be eliminated as much as possible, and thus improving the image quality.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a convex surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 1 shows surface type, radius of curvature, thickness, material and conic coefficient of each lens of the optical imaging lens assembly in example 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8417 | 0.6600 | 1.55 | 56.1 | −0.0849 |
| S2 | aspheric | 8.7316 | 0.0970 | | | 17.0372 |
| STO | spherical | infinite | 0.0453 | | | |
| S3 | aspheric | 10.8758 | 0.2350 | 1.67 | 20.4 | 12.0435 |
| S4 | aspheric | 4.9294 | 0.0361 | | | −24.2665 |
| S5 | aspheric | 3.6780 | 0.2300 | 1.67 | 20.4 | −21.7210 |
| S6 | aspheric | 3.0781 | 0.2142 | | | −2.3874 |
| S7 | aspheric | 8.6658 | 0.3801 | 1.55 | 56.1 | 60.1533 |
| S8 | aspheric | −20.3615 | 0.1171 | | | 61.1630 |
| S9 | aspheric | 7.5415 | 0.2558 | 1.67 | 20.4 | 19.4726 |
| S10 | aspheric | 6.7825 | 0.1342 | | | −3.4129 |
| S11 | aspheric | 8.7234 | 0.2389 | 1.67 | 20.4 | 41.2476 |
| S12 | aspheric | 8.3889 | 0.2328 | | | −3.8433 |
| S13 | aspheric | 8.7145 | 0.3947 | 1.55 | 56.1 | 29.9912 |
| S14 | aspheric | −2.1380 | 0.3601 | | | −27.0591 |
| S15 | aspheric | −3.6085 | 0.3026 | 1.54 | 55.7 | −1.1301 |
| S16 | aspheric | 1.7831 | 0.2566 | | | −11.1367 |
| S17 | spherical | infinite | 0.1100 | 1.52 | 64.2 | |
| S18 | spherical | infinite | 0.5094 | | | |
| S19 | spherical | infinite | | | | |

As can be seen from Table 1, the object-side surface and the image-side surface of any one of the first lens E1 to the eighth lens E8 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1-S16 in example 1.

TABLE 2

| Surface number | A4 | A6 | A8 | A10 | A12 |
|---|---|---|---|---|---|
| S1 | −1.0210E−02 | 1.5600E−04 | −2.4760E−02 | 4.6719E−02 | −6.3230E−02 |
| S2 | −4.3360E−02 | −7.6420E−02 | 3.8243E−01 | −8.7075E−01 | 1.2059E+00 |
| S3 | −6.7760E−02 | 3.5593E−02 | 1.2883E−01 | −4.0684E−01 | 7.1265E−01 |
| S4 | 1.1342E−02 | −2.0293E−01 | 7.6044E−01 | −2.7533E+00 | 6.3392E+00 |
| S5 | 5.2124E−02 | −2.0150E−01 | 5.4182E−01 | −2.5326E+00 | 6.7383E+00 |
| S6 | −6.6700E−03 | −1.4040E−01 | 9.8180E−01 | −3.9659E+00 | 8.9363E+00 |
| S7 | −1.1043E−01 | 3.9284E−01 | −2.4423E+00 | 8.8718E+00 | −2.0640E+01 |

TABLE 2-continued

| S8  | −1.5655E−01 | −1.3655E−01 | 8.0244E−01  | −2.5103E+00 | 4.7938E+00  |
|-----|-------------|-------------|-------------|-------------|-------------|
| S9  | −2.1678E−01 | 6.6112E−02  | −1.0063E+00 | 4.1476E+00  | −9.2524E+00 |
| S10 | −9.7380E−02 | −6.8910E−02 | −4.2780E−02 | 2.2541E−01  | −1.9444E−01 |
| S11 | −1.4236E−01 | 2.7179E−01  | −6.1780E−01 | 9.8656E−01  | −1.1632E+00 |
| S12 | −1.7528E−01 | 1.6121E−01  | −1.9481E−01 | 2.2716E−01  | −1.9343E−01 |
| S13 | 1.6715E−02  | −1.1865E−01 | 2.9925E−02  | 5.1957E−02  | −5.2080E−02 |
| S14 | −8.5130E−02 | 3.5131E−01  | −7.8850E−01 | 9.5724E−01  | −6.8705E−01 |
| S15 | −1.9370E−01 | 6.9666E−02  | −4.3540E−02 | 7.1654E−02  | −4.8110E−02 |
| S16 | −1.4917E−01 | 9.4648E−02  | −4.8060E−02 | 1.9376E−02  | −5.9300E−03 |

| Surface number | A14 | A16 | A18 | A20 |
|---|---|---|---|---|
| S1  | 5.0875E−02  | −2.4630E−02 | 6.5440E−03  | −7.1000E−04 |
| S2  | −1.0456E+00 | 5.5314E−01  | −1.6328E−01 | 2.0678E−02  |
| S3  | −7.9996E−01 | 5.5730E−01  | −2.1964E−01 | 3.8002E−02  |
| S4  | −8.7505E+00 | 7.1475E+00  | −3.2026E+00 | 6.1002E−01  |
| S5  | −9.9310E+00 | 8.4157E+00  | −3.8655E+00 | 7.4631E−01  |
| S6  | −1.1664E+01 | 8.7375E+00  | −3.3938E+00 | 5.0335E−01  |
| S7  | 3.0488E+01  | −2.7712E+01 | 1.4199E+01  | −3.1370E+00 |
| S8  | −5.6995E+00 | 4.0425E+00  | −1.5125E+00 | 2.1522E−01  |
| S9  | 1.2580E+01  | −1.0452E+01 | 4.8870E+00  | −9.9279E−01 |
| S10 | −1.1425E−01 | 2.8311E−01  | −1.7179E−01 | 3.6635E−02  |
| S11 | 9.2566E−01  | −4.8395E−01 | 1.4936E−01  | −2.0010E−02 |
| S12 | 8.9146E−02  | −1.6950E−02 | −2.4000E−04 | 3.4300E−04  |
| S13 | 1.5537E−02  | −2.0200E−03 | 9.1100E−04  | −2.4000E−04 |
| S14 | 2.9965E−01  | −7.8130E−02 | 1.1228E−02  | −6.9000E−04 |
| S15 | 1.6314E−02  | −3.0600E−03 | 3.0700E−04  | −1.3000E−05 |
| S16 | 1.2610E−03  | −1.7000E−04 | 1.3000E−05  | −4.4000E−07 |

Table 3 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 1.

TABLE 3

| f1 (mm) | 4.14    | f7 (mm)   | 3.19  |
|---------|---------|-----------|-------|
| f2 (mm) | −13.76  | f8 (mm)   | −2.18 |
| f3 (mm) | −33.48  | f (mm)    | 3.87  |
| f4 (mm) | 11.19   | TTL (mm)  | 4.81  |
| f5 (mm) | −116.99 | ImgH (mm) | 3.10  |
| f6 (mm) | −460.02 | FOV (°)   | 75.9  |

The optical imaging lens assembly in example 1 satisfies the followings:

f/EPD=1.61, where f is the total effective focal length of the optical imaging lens assembly, and EPD is an entrance pupil diameter of the optical imaging lens assembly;

TTL/ImgH=1.55, where TTL is the distance on the optical axis from the center of the object-side surface S1 of the first lens E1 to the imaging plane S19 and ImgH is half of the diagonal length of the effective pixel area on the imaging plane S19;

f1/f=1.07, where f1 is the effective focal length of the first lens E1 and f is the total effective focal length of the optical imaging lens assembly;

f/f2=−0.28, where f is the total effective focal length of the optical imaging lens assembly and f2 is the effective focal length of the second lens E2;

f7/f8=−1.46, where f7 is the effective focal length of the seventh lens E7 and f8 is the effective focal length of the eighth lens E8;

R8/R7=−2.35, where R8 is a radius of curvature of the image-side surface S8 of the fourth lens E4 and R7 is a radius of curvature of the object-side surface S7 of the fourth lens E4;

CT4/CT5=1.49, where CT4 is a center thickness of the fourth lens E4 on the optical axis and CT5 is a center thickness of the fifth lens E5 on the optical axis;

f/R10=0.57, where f is the total effective focal length of the optical imaging lens assembly and R10 is a radius of curvature of the image-side surface S10 of the fifth lens E5;

T67/T78=0.65, where T67 is a spaced distance between the sixth lens E6 and the seventh lens E7 on the optical axis and T78 is a spaced distance between the seventh lens E7 and the eighth lens E8 on the optical axis;

R6/R5=0.84, where R6 is a radius of curvature of the image-side surface S6 of the third lens E3 and R5 is a radius of curvature of the object-side surface S5 of the third lens E3;

f1/R1=2.25, where f1 is the effective focal length of the first lens E1 and R1 is a radius of curvature of the object-side surface S1 of the first lens E1;

f/CT6=16.22, where f is the total effective focal length of the optical imaging lens assembly and CT6 is a center thickness of the sixth lens E6 on the optical axis.

Figure 2A:
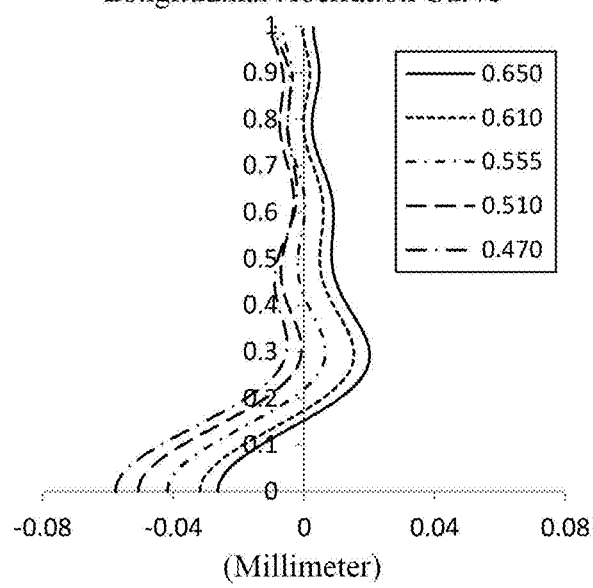
FIGS. 2A to 2D illustrate a longitudinal aberration curve, an astigmatic curve, a distortion curve and a lateral color curve of the optical imaging lens assembly of the Example 1, respectively.
Figure 2B:
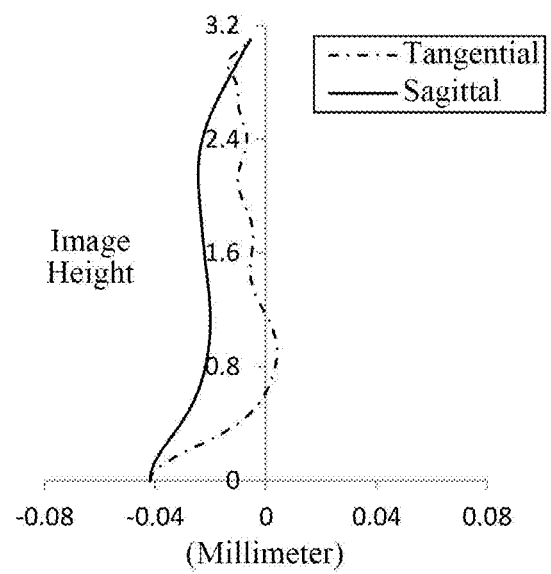
Figure 2C:
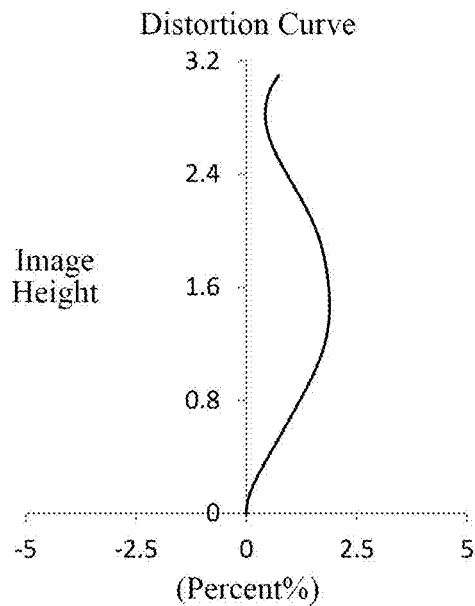
Figure 2D:
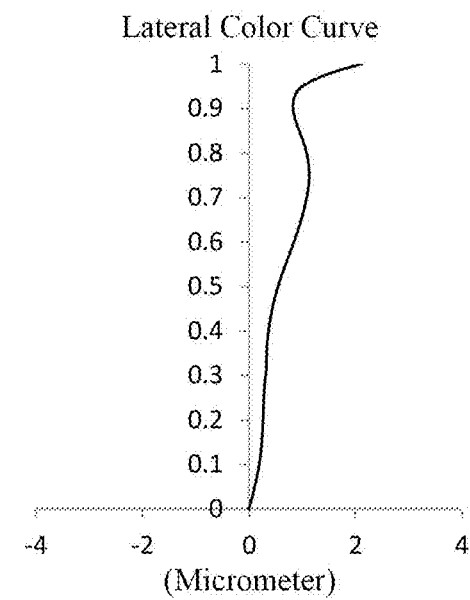

In addition, FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatism curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different field of view. FIG. 2D illustrates a lateral color curve of the optical imaging lens assembly according to example 1, representing deviations of different image heights on an imaging plane after light passes through the optical imaging lens assembly. It can be seen from FIG. 2A to FIG. 2D that the optical imaging lens assembly provided in example 1 may achieve good image quality.

Example 2

Figure 3:
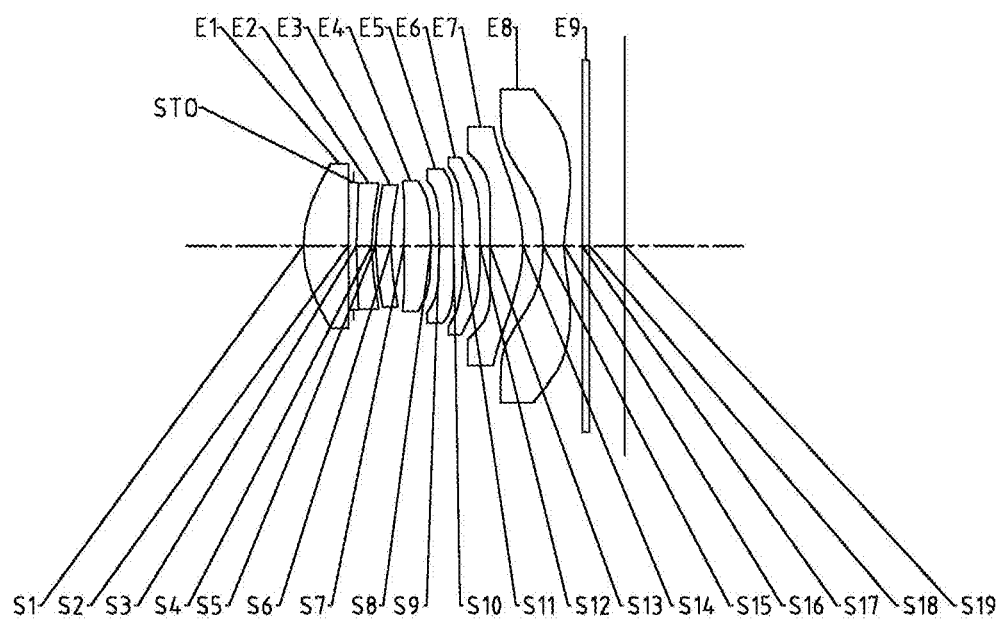
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 is a schematic structural view of the optical imaging lens assembly according to example 2 of the present disclosure.

As shown in FIG. 3, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 4 shows surface type, radius of curvature, thickness, material and conic coefficient of each lens of the optical imaging lens assembly in example 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.8024 | 0.6786 | 1.55 | 56.1 | −0.0926 |
| S2 | aspheric | 9.8490 | 0.0818 | | | −7.8417 |
| STO | spherical | infinite | 0.0400 | | | |
| S3 | aspheric | 7.5750 | 0.2300 | 1.67 | 20.4 | −4.9296 |
| S4 | aspheric | 3.5754 | 0.0591 | | | −2.9269 |
| S5 | aspheric | 3.3111 | 0.2300 | 1.67 | 20.4 | −8.1943 |
| S6 | aspheric | 3.2113 | 0.1960 | | | −3.8315 |
| S7 | aspheric | 8.3261 | 0.4111 | 1.55 | 56.1 | 66.2239 |
| S8 | aspheric | −12.4438 | 0.1247 | | | 30.6301 |
| S9 | aspheric | 39.0562 | 0.2160 | 1.67 | 20.4 | −99.0000 |
| S10 | aspheric | 8.3395 | 0.1431 | | | 39.1322 |
| S11 | aspheric | −54.1567 | 0.2577 | 1.67 | 20.4 | −35.4357 |
| S12 | aspheric | −980.3470 | 0.1465 | | | −99.0000 |
| S13 | aspheric | 9.1521 | 0.4989 | 1.55 | 56.1 | 34.6662 |
| S14 | aspheric | −1.8300 | 0.3057 | | | −9.5811 |
| S15 | aspheric | −3.3487 | 0.3113 | 1.54 | 55.7 | −1.3559 |
| S16 | aspheric | 1.6443 | 0.2783 | | | −12.5230 |
| S17 | spherical | infinite | 0.1100 | 1.52 | 64.2 | |
| S18 | spherical | infinite | 0.5311 | | | |
| S19 | spherical | infinite | | | | |

As can be seen from Table 4, in example 2, the object-side surface and the image-side surface of any one of the first lens E1 to the eighth lens E8 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 |
|---|---|---|---|---|---|
| S1 | −8.4300E−03 | −6.2900E−03 | 1.4203E−02 | −6.8040E−02 | 1.3531E−01 |
| S2 | −5.4010E−02 | −1.1253E−01 | 5.8970E−02 | −1.3715E+00 | 2.0028E+00 |
| S3 | −5.0780E−02 | −1.9306E−01 | 7.6459E−01 | −9.6006E−01 | −2.4147E−01 |
| S4 | 1.1092E−01 | −6.9443E−01 | 1.8143E+00 | −2.5858E+00 | 4.1928E−01 |
| S5 | 1.3272E−01 | −5.1777E−01 | 8.8166E−01 | −4.5074E−01 | −2.7401E+00 |
| S6 | −3.0700E−03 | −7.4880E−02 | 4.5034E−02 | 6.0709E−01 | −3.5874E+00 |
| S7 | −9.9820E−02 | 1.1944E−01 | −1.2449E+00 | 5.6006E+00 | −1.5951E+01 |
| S8 | −1.3684E−01 | 1.0139E−01 | −6.2196E−01 | 1.3891E+00 | −2.0674E+00 |
| S9 | −2.3436E−01 | 4.5243E−01 | −1.7013E+00 | 4.0966E+00 | −6.8412E+00 |
| S10 | −2.3365E−01 | 4.6981E−01 | −1.2098E+00 | 2.1784E+00 | −2.6220E+00 |
| S11 | −1.5455E−01 | 1.0278E−01 | 2.5543E−01 | −1.4258E+00 | 2.9663E+00 |
| S12 | −1.3113E−01 | −1.5169E−01 | 7.9894E−01 | −1.8345E+00 | 2.4601E+00 |
| S13 | −2.4850E−02 | −2.2697E−01 | 4.4062E−01 | −5.0985E−01 | 3.0227E−01 |
| S14 | 2.0145E−02 | −1.0483E−01 | 1.4529E−01 | −9.3560E−02 | 2.0023E−02 |
| S15 | −2.6016E−01 | 2.0973E−01 | −1.2957E−01 | 7.4708E−02 | −2.8800E−02 |
| S16 | −1.6927E−01 | 1.5281E−01 | −1.0834E−01 | 5.5159E−02 | −1.9650E−02 |

| Surface number | A14 | A16 | A18 | A20 |
|---|---|---|---|---|
| S1 | −1.5408E−01 | 9.9884E−02 | −3.5050E−02 | 5.1460E−03 |
| S2 | −1.9076E+00 | 1.1387E+00 | −3.8511E−01 | 5.6189E−02 |
| S3 | 2.3857E+00 | −3.2641E+00 | 2.0417E+00 | −5.0923E−01 |

TABLE 5-continued

| | | | | |
|---|---|---|---|---|
| S4 | 5.2014E+00 | −9.0582E+00 | 6.7597E+00 | −1.9440E+00 |
| S5 | 8.2302E+00 | −1.0801E+01 | 7.3888E+00 | −2.1131E+00 |
| S6 | 9.1978E+00 | −1.2563E+01 | 9.0416E+00 | −2.6707E+00 |
| S7 | 2.8594E+01 | −3.1332E+01 | 1.9196E+01 | −4.9904E+00 |
| S8 | 1.9312E+00 | −8.1511E−01 | −8.4330E−02 | 1.4200E−01 |
| S9 | 7.3436E+00 | −4.6310E+00 | 1.4922E+00 | −1.7707E−01 |
| S10 | 1.9728E+00 | −8.6915E−01 | 1.9102E−01 | −1.2510E−02 |
| S11 | −3.3851E+00 | 2.1910E+00 | −7.5402E−01 | 1.0751E−01 |
| S12 | −2.0189E+00 | 9.9857E−01 | −2.7215E−01 | 3.1280E−02 |
| S13 | −5.8030E−02 | −3.3530E−02 | 2.1201E−02 | −3.4200E−03 |
| S14 | 8.0960E−03 | −5.6400E−03 | 1.2040E−03 | −9.1000E−05 |
| S15 | 6.5250E−03 | −8.2000E−04 | 5.0200E−05 | −1.0000E−06 |
| S16 | 4.7090E−03 | −7.2000E−04 | 6.2900E−05 | −2.4000E−06 |

Table 6 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 2.

TABLE 6

| | | | |
|---|---|---|---|
| f1 (mm) | 3.92 | f7 (mm) | 2.84 |
| f2 (mm) | −10.41 | f8 (mm) | −2.01 |
| f3 (mm) | −2035.25 | f (mm) | 4.04 |
| f4 (mm) | 9.20 | TTL (mm) | 4.85 |
| f5 (mm) | −15.97 | ImgH (mm) | 3.15 |
| f6 (mm) | −86.12 | FOV (°) | 74.8 |

Figure 4A:
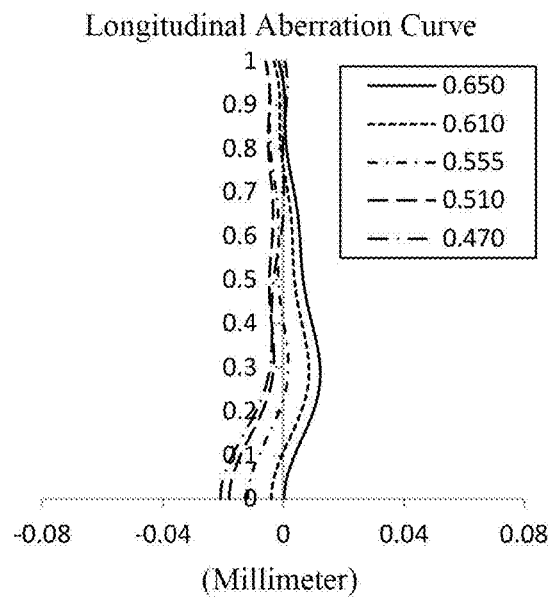
FIGS. 4A to 4D illustrate a longitudinal aberration curve, an astigmatic curve, a distortion curve and a lateral color curve of the optical imaging lens assembly of the Example 2, respectively.
Figure 4B:
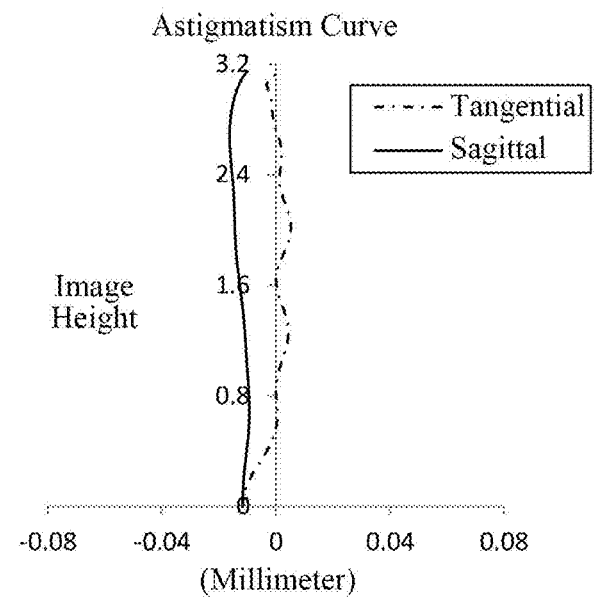
Figure 4C:
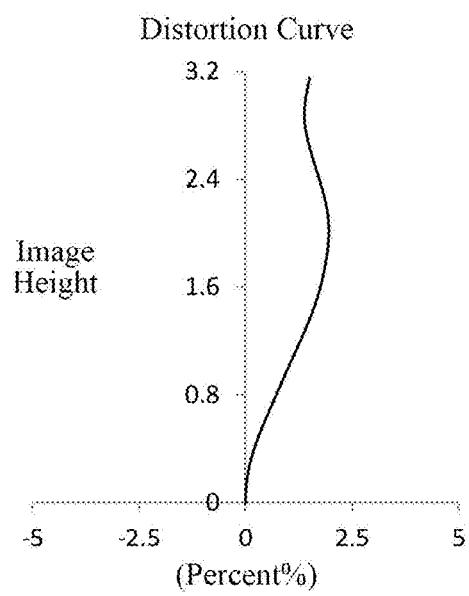
Figure 4D:
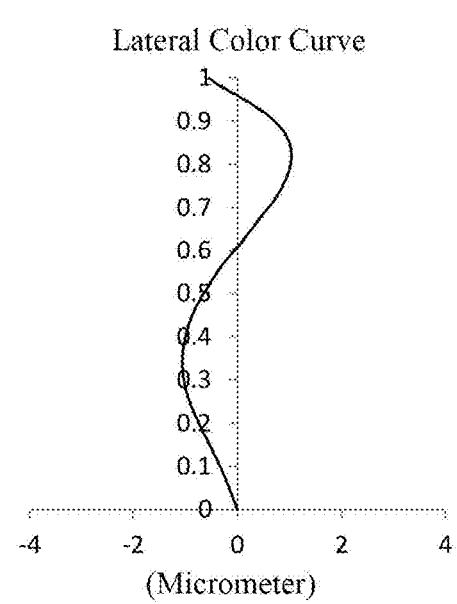

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatism curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion at different field of view. FIG. 4D illustrates a lateral color curve of the optical imaging lens assembly according to example 2, representing deviations of different image heights on an imaging plane after light passes through the optical imaging lens assembly. It can be seen from FIG. 4A to FIG. 4D that the optical imaging lens assembly provided in example 2 may achieve good image quality.

Example 3

Figure 5:
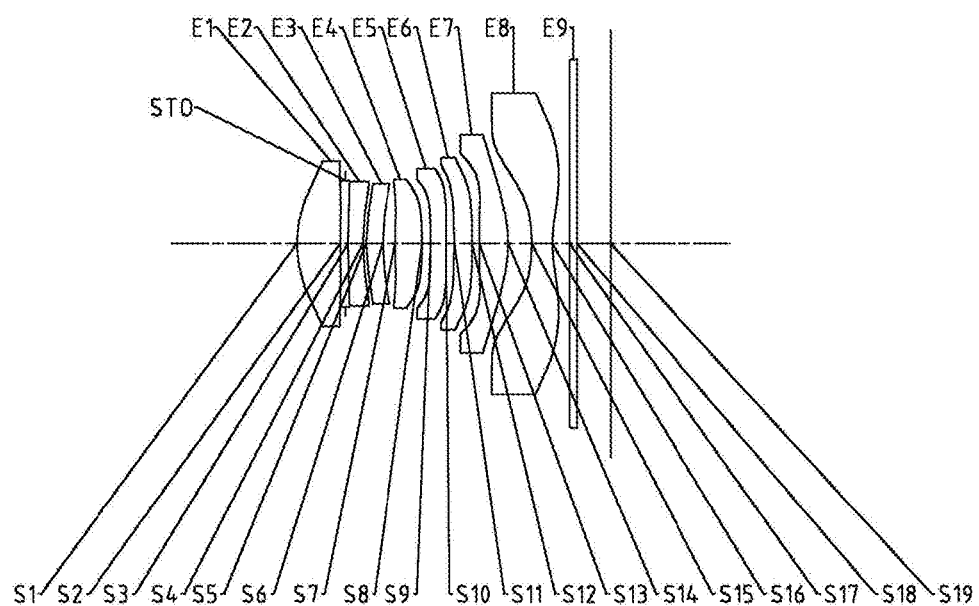
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 is a schematic structural view of the optical imaging lens assembly according to example 3 of the present disclosure.

As shown in FIG. 5, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a convex surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 7 shows surface type, radius of curvature, thickness, material and conic coefficient of each lens of the optical imaging lens assembly in example 3, wherein the units for the radius of curvature and the thickness are millimeter (mm).

TABLE 7

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8679 | 0.6700 | 1.55 | 56.1 | −0.1217 |
| S2 | aspheric | 10.8423 | 0.0798 | | | −4.6400 |
| STO | spherical | infinite | 0.0400 | | | |
| S3 | aspheric | 10.0314 | 0.2300 | 1.67 | 20.4 | 8.3976 |
| S4 | aspheric | 3.7331 | 0.0511 | | | −6.8942 |
| S5 | aspheric | 3.1290 | 0.2556 | 1.67 | 20.4 | −12.3662 |
| S6 | aspheric | 3.2828 | 0.1979 | | | −4.0787 |
| S7 | aspheric | 8.4359 | 0.4158 | 1.55 | 56.1 | 65.9917 |
| S8 | aspheric | −10.4980 | 0.1330 | | | 75.6579 |
| S9 | aspheric | 40.5139 | 0.2365 | 1.67 | 20.4 | −99.0000 |
| S10 | aspheric | 8.9429 | 0.1289 | | | 40.5289 |
| S11 | aspheric | 73.7002 | 0.2723 | 1.67 | 20.4 | −99.0000 |
| S12 | aspheric | 30.0840 | 0.1124 | | | −49.0594 |

TABLE 7-continued

| Surface number | Surface type | Radius of curvature | Thickness | Material Refractive index | Abbe number | Conic coefficient |
|---|---|---|---|---|---|---|
| S13 | aspheric | 9.5034 | 0.4465 | 1.55 | 56.1 | 36.5754 |
| S14 | aspheric | −1.9611 | 0.3623 | | | −12.6928 |
| S15 | aspheric | −3.4794 | 0.3157 | 1.54 | 55.7 | −1.2303 |
| S16 | aspheric | 1.7053 | 0.2697 | | | −11.5549 |
| S17 | spherical | infinite | 0.1100 | 1.52 | 64.2 | |
| S18 | spherical | infinite | 0.5225 | | | |
| S19 | spherical | infinite | | | | |

As can be seen from Table 7, in example 3, the object-side surface and the image-side surface of any one of the first lens E1 to the eighth lens E8 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 |
|---|---|---|---|---|---|
| S1 | −9.8300E−03 | −1.1290E−02 | 2.9854E−02 | −9.6220E−02 | 1.5717E−01 |
| S2 | −5.3290E−02 | −7.4220E−02 | 3.9090E−01 | −8.6254E−01 | 1.1911E+00 |
| S3 | −4.7340E−02 | −1.5877E−01 | 7.7836E−01 | −1.7942E+00 | 2.9722E+00 |
| S4 | 7.7867E−02 | −6.0779E−01 | 1.7871E+00 | −4.0177E+00 | 7.2456E+00 |
| S5 | 1.0741E−01 | −4.7280E−01 | 9.5106E−01 | −1.9021E+00 | 3.5326E+00 |
| S6 | −7.5800E−03 | −5.5540E−02 | 6.2280E−02 | 5.8783E−02 | −1.3897E+00 |
| S7 | −1.0036E−01 | 1.0576E−01 | −1.1060E+00 | 4.8606E+00 | −1.3819E+01 |
| S8 | −1.4324E−01 | −5.0540E−02 | −1.9820E−02 | −2.6150E−01 | 9.6197E−01 |
| S9 | −1.9902E−01 | 9.7771E−02 | −1.4257E−01 | −1.0199E+00 | 4.0232E+00 |
| S10 | −2.0315E−01 | 2.0410E−01 | 5.0996E−02 | −1.3201E+00 | 3.3041E+00 |
| S11 | −1.8937E−01 | 1.0297E−01 | 5.1949E−01 | −1.8471E+00 | 2.9669E+00 |
| S12 | −1.4795E−01 | −1.9870E−01 | 1.0957E+00 | −2.4440E+00 | 3.1795E+00 |
| S13 | −9.4000E−03 | −3.0240E−01 | 7.6101E−01 | −1.2239E+00 | 1.2462E+00 |
| S14 | −1.4160E−02 | 1.4375E−02 | −5.9110E−02 | 1.3436E−01 | −1.4564E−01 |
| S15 | −2.4979E−01 | 1.6409E−01 | −7.8100E−02 | 4.8501E−02 | −2.2210E−02 |
| S16 | −1.5879E−01 | 1.2541E−01 | −7.6140E−02 | 3.3901E−02 | −1.0810E−02 |

| Surface number | A14 | A16 | A18 | A20 |
|---|---|---|---|---|
| S1 | −1.5458E−01 | 8.9570E−02 | −2.8630E−02 | 3.8890E−03 |
| S2 | −1.0757E+00 | 6.0964E−01 | −1.9589E−01 | 2.7179E−02 |
| S3 | −3.6551E+00 | 3.0713E+00 | −1.5180E+00 | 3.2852E−01 |
| S4 | −9.7821E+00 | 8.9275E+00 | −4.7282E+00 | 1.1182E+00 |
| S5 | −4.8440E+00 | 4.1253E+00 | −1.6755E+00 | 1.7763E−01 |
| S6 | 5.2047E+00 | −8.9619E+00 | 7.6423E+00 | −2.5773E+00 |
| S7 | 2.5084E+01 | −2.8126E+01 | 1.7798E+01 | −4.8108E+00 |
| S8 | −1.2590E+00 | 8.0618E−01 | −2.5074E−01 | 3.7865E−02 |
| S9 | −6.9557E+00 | 6.8194E+00 | −3.6879E+00 | 8.4487E−01 |
| S10 | −4.2636E+00 | 3.1064E+00 | −1.2209E+00 | 2.0402E−01 |
| S11 | −2.7152E+00 | 1.3840E+00 | −3.5221E−01 | 3.3340E−02 |
| S12 | −2.5373E+00 | 1.2189E+00 | −3.2306E−01 | 3.6340E−02 |
| S13 | −8.2248E−01 | 3.3864E−01 | −7.8960E−02 | 8.0520E−03 |
| S14 | 8.3993E−02 | −2.6700E−02 | 4.4360E−03 | −3.0000E−04 |
| S15 | 5.8600E−03 | −8.5000E−04 | 6.0300E−05 | −1.5000E−06 |
| S16 | 2.3580E−03 | −3.3000E−04 | 2.6900E−05 | −9.6000E−07 |

Table 9 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 3.

TABLE 9

| f1 (mm) | 4.03 | f7 (mm) | 3.02 |
|---|---|---|---|
| f2 (mm) | −9.06 | f8 (mm) | −2.09 |

TABLE 9-continued

| f3 (mm) | 60.27 | f (mm) | 3.98 |
|---|---|---|---|
| f4 (mm) | 8.63 | TTL (mm) | 4.85 |
| f5 (mm) | −17.29 | ImgH (mm) | 3.31 |
| f6 (mm) | −76.55 | FOV (°) | 78.2 |

Figures 6A, 6B:
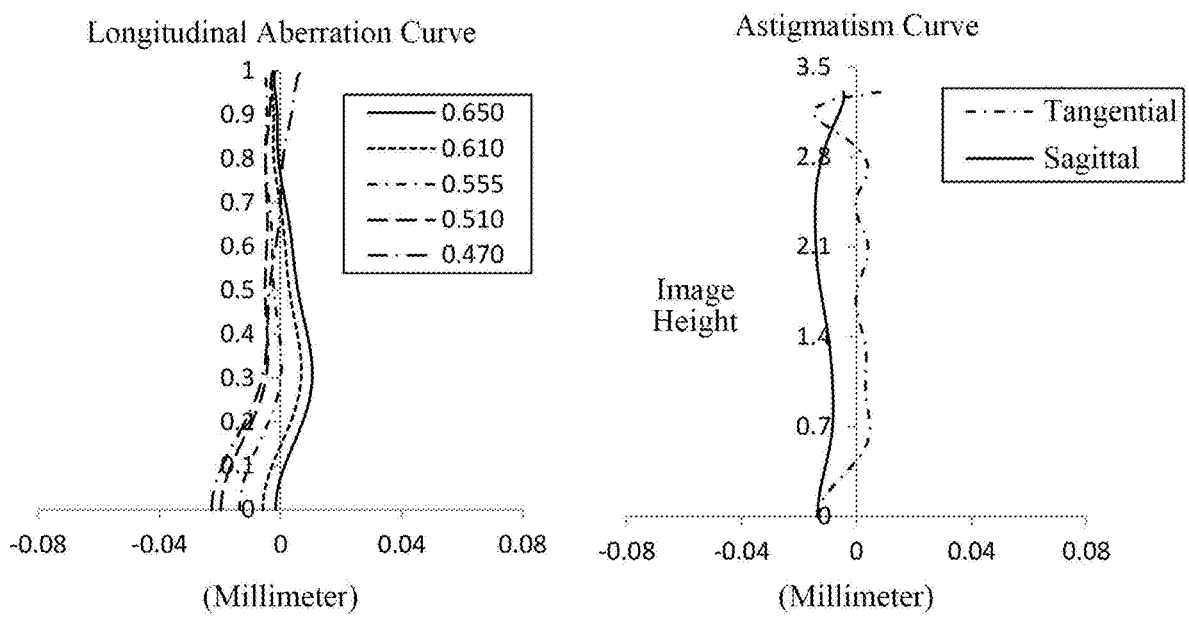
FIGS. 6A to 6D illustrate a longitudinal aberration curve, an astigmatic curve, a distortion curve and a lateral color curve of the optical imaging lens assembly of the Example 3, respectively.
Figure 6C:
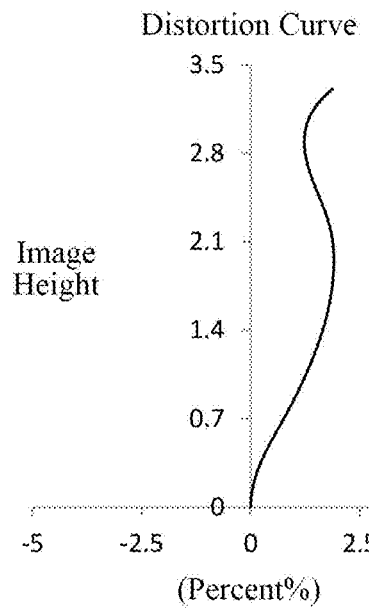
Figure 6D:
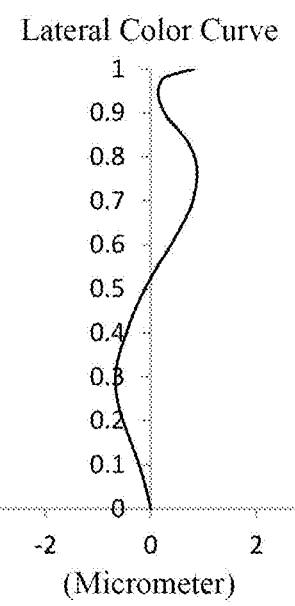

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatism curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion at different field of view. FIG. 6D illustrates a lateral color curve of the optical imaging lens assembly according to example 3, representing deviations of different image heights on an imaging plane after light passes through the optical imaging lens assembly. It can be seen from FIG. 6A to FIG. 6D that the optical imaging lens assembly provided in example 3 may achieve good image quality.

Example 4

Figure 7:
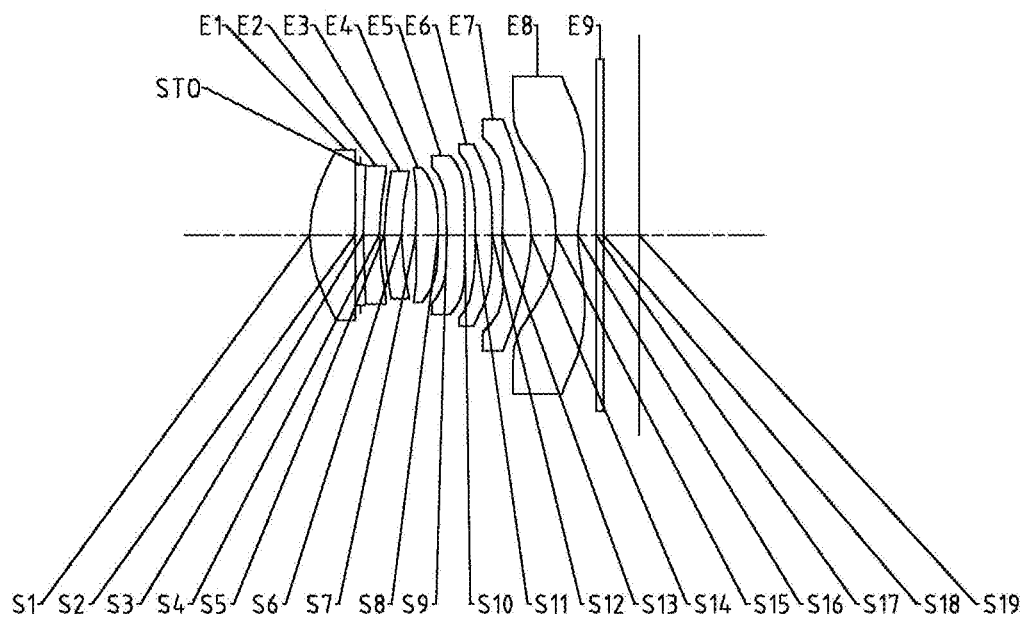
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 is a schematic structural view of the optical imaging lens assembly according to example 4 of the present disclosure.

As shown in FIG. 7, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 10 shows surface type, radius of curvature, thickness, material and conic coefficient of each lens of the optical imaging lens assembly in example 4, wherein the units for the radius of curvature and the thickness are millimeter (mm).

TABLE 10

| Surface number | Surface type | Radius of curvature | Thickness | Refractive index | Abbe number | Conic coefficient |
| --- | --- | --- | --- | --- | --- | --- |
| OBJ | spherical | infinite | infinite | | | |
| S1 | aspheric | 1.8680 | 0.6650 | 1.55 | 56.1 | −0.1322 |
| S2 | aspheric | 9.8855 | 0.0830 | | | −0.4801 |
| STO | spherical | infinite | 0.0400 | | | |
| S3 | aspheric | 9.2047 | 0.2350 | 1.67 | 20.4 | 14.4859 |
| S4 | aspheric | 3.5107 | 0.0728 | | | −7.5830 |
| S5 | aspheric | 3.0813 | 0.2555 | 1.67 | 20.4 | −14.3832 |
| S6 | aspheric | 3.3647 | 0.2086 | | | −3.0777 |
| S7 | aspheric | 8.7744 | 0.3325 | 1.55 | 56.1 | 64.7649 |
| S8 | aspheric | −9.4934 | 0.1259 | | | 76.0601 |
| S9 | aspheric | 109.5718 | 0.2633 | 1.67 | 20.4 | −99.0000 |
| S10 | aspheric | 11.0016 | 0.1559 | | | 20.3051 |
| S11 | aspheric | −199.0080 | 0.2481 | 1.67 | 20.4 | 99.0000 |
| S12 | aspheric | 95.3126 | 0.1493 | | | −99.0000 |
| S13 | aspheric | 10.2656 | 0.4230 | 1.55 | 56.1 | 36.1281 |
| S14 | aspheric | −1.9546 | 0.3648 | | | −15.1731 |
| S15 | aspheric | −3.4032 | 0.3241 | 1.54 | 55.7 | −1.2129 |
| S16 | aspheric | 1.7018 | 0.2703 | | | −11.4040 |
| S17 | spherical | infinite | 0.1100 | 1.52 | 64.2 | |
| S18 | spherical | infinite | 0.5231 | | | |
| S19 | spherical | infinite | | | | |

As can be seen from Table 10, in example 4, the object-side surface and the image-side surface of any one of the first lens E1 to the eighth lens E8 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 |
| --- | --- | --- | --- | --- | --- |
| S1 | −1.0920E−02 | −7.8400E−03 | 1.2699E−02 | −5.4100E−02 | 9.1932E−02 |
| S2 | −5.1830E−02 | −5.8160E−02 | 3.0661E−01 | −6.7571E−01 | 9.4109E−01 |
| S3 | −5.0580E−02 | −6.5780E−02 | 3.2029E−01 | −4.1949E−01 | 1.1315E−01 |
| S4 | 3.2861E−02 | −3.5512E−01 | 1.2838E+00 | −3.9690E+00 | 9.4882E+00 |
| S5 | 5.9851E−02 | −2.0879E−01 | 5.7695E−01 | 6.4382E−01 | −2.0802E+00 |
| S6 | −1.5150E−02 | −3.6480E−02 | 1.9233E−02 | 1.8488E−01 | −1.3190E+00 |
| S7 | −1.0229E−01 | 1.8133E−01 | −1.5400E+00 | 6.3318E+00 | −1.6556E+01 |
| S8 | −1.5639E−01 | −6.1110E−02 | 3.0446E−01 | −1.8195E+00 | 5.5406E+00 |
| S9 | −2.2571E−01 | 1.7054E−01 | −6.9507E−01 | 1.1762E+00 | −4.8938E−01 |
| S10 | −1.9224E−01 | 2.7939E−01 | −6.1230E−01 | 7.3989E−01 | −2.4492E−01 |
| S11 | −2.1283E−01 | 3.2197E−01 | −3.3395E−01 | 5.1483E−02 | 3.4519E−01 |
| S12 | −1.9536E−01 | 4.6536E−02 | 2.8469E−01 | −7.7759E−01 | 1.0943E+00 |
| S13 | 2.7810E−03 | −2.0302E−01 | 3.1234E−01 | −3.4010E−01 | 2.6326E−01 |
| S14 | −2.9210E−02 | 1.0140E−01 | −2.6353E−01 | 3.7361E−01 | −3.0339E−01 |
| S15 | −2.4132E−01 | 1.5235E−01 | −7.0590E−02 | 4.5755E−02 | −2.2210E−02 |
| S16 | −1.5944E−01 | 1.2644E−01 | −7.6280E−02 | 3.3696E−02 | −1.0660E−02 |

TABLE 11-continued

| Surface number | A14 | A16 | A18 | A20 |
|---|---|---|---|---|
| S1 | −9.1870E−02 | 5.3201E−02 | −1.6770E−02 | 2.2200E−03 |
| S2 | −8.5468E−01 | 4.8374E−01 | −1.5422E−01 | 2.1113E−02 |
| S3 | 3.8762E−01 | −5.6996E−01 | 3.4019E−01 | −7.8220E−02 |
| S4 | −1.5623E+01 | 1.6317E+01 | −9.6227E+00 | 2.4587E+00 |
| S5 | 3.4853E+00 | −3.3100E+00 | 1.7460E+00 | −3.9661E−01 |
| S6 | 3.9546E+00 | −5.9488E+00 | 4.5622E+00 | −1.4093E+00 |
| S7 | 2.7343E+01 | −2.7731E+01 | 1.5819E+01 | −3.8531E+00 |
| S8 | −9.6028E+00 | 9.7737E+00 | −5.4617E+00 | 1.3058E+00 |
| S9 | −1.5366E+00 | 2.8728E+00 | −2.0185E+00 | 5.1957E−01 |
| S10 | −6.0119E−01 | 8.4874E−01 | −4.4513E−01 | 8.7647E−02 |
| S11 | −4.6900E−01 | 2.2407E−01 | −1.9680E−02 | −7.8300E−03 |
| S12 | −9.2405E−01 | 4.5812E−01 | −1.2140E−01 | 1.3249E−02 |
| S13 | −1.4991E−01 | 5.7389E−02 | −1.3010E−02 | 1.3720E−03 |
| S14 | 1.4496E−01 | −4.0320E−02 | 6.0470E−03 | −3.8000E−04 |
| S15 | 6.3840E−03 | −1.0700E−03 | 9.9700E−05 | −4.1000E−06 |
| S16 | 2.3120E−03 | −3.2000E−04 | 2.6300E−05 | −9.4000E−07 |

Table 12 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 4.

TABLE 12

| f1 (mm) | 4.10 | f7 (mm) | 3.04 |
|---|---|---|---|
| f2 (mm) | −8.67 | f8 (mm) | −2.07 |
| f3 (mm) | 40.40 | f (mm) | 3.98 |
| f4 (mm) | 8.41 | TTL (mm) | 4.85 |
| f5 (mm) | −18.39 | ImgH (mm) | 2.93 |
| f6 (mm) | −96.77 | FOV (°) | 71.7 |

Figure 8A:
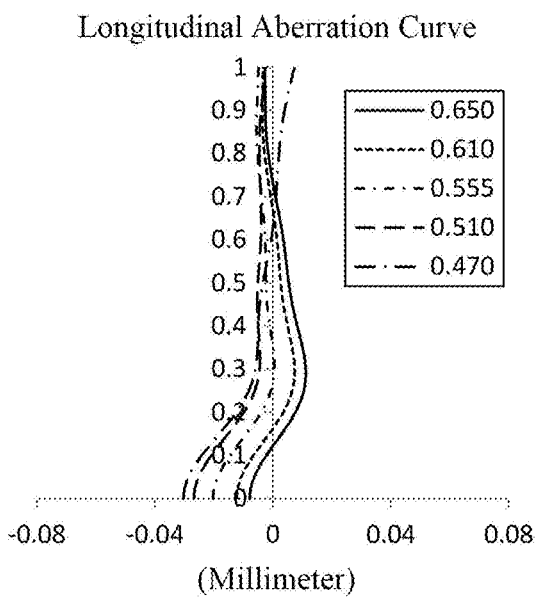
FIGS. 8A to 8D illustrate a longitudinal aberration curve, an astigmatic curve, a distortion curve and a lateral color curve of the optical imaging lens assembly of the Example 4, respectively.
Figure 8B:
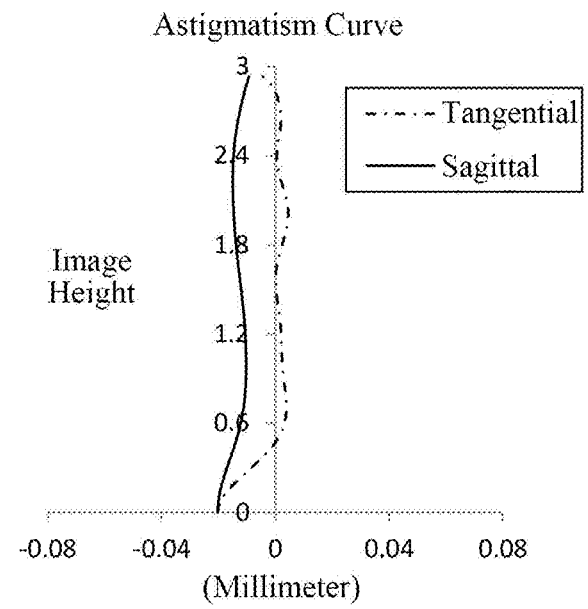
Figure 8C:
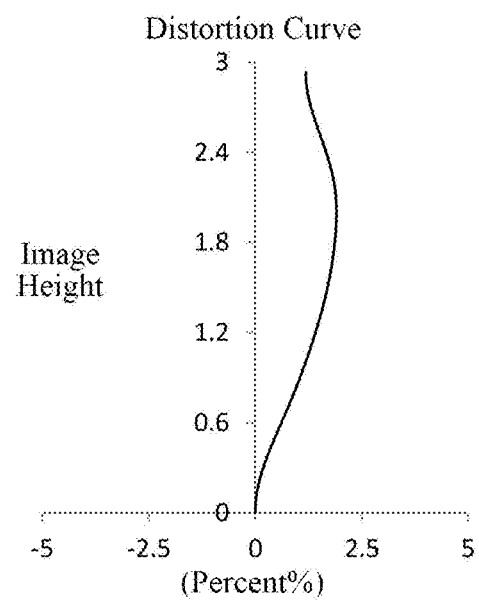
Figure 8D:
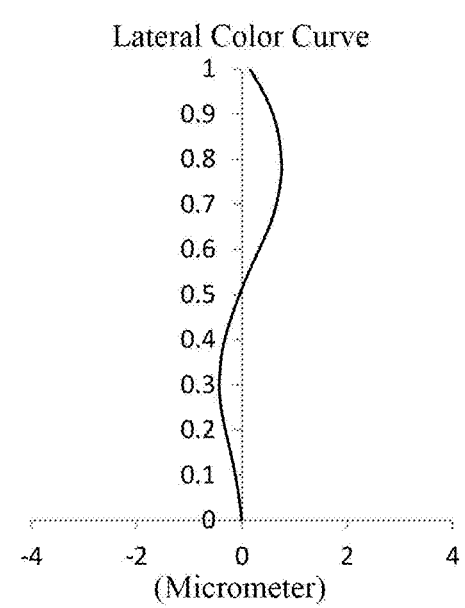

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatism curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion at different field of view. FIG. 8D illustrates a lateral color curve of the optical imaging lens assembly according to example 4, representing deviations of different image heights on an imaging plane after light passes through the optical imaging lens assembly. It can be seen from FIG. 8A to FIG. 8D that the optical imaging lens assembly provided in example 4 may achieve good image quality.

Example 5

Figure 9:
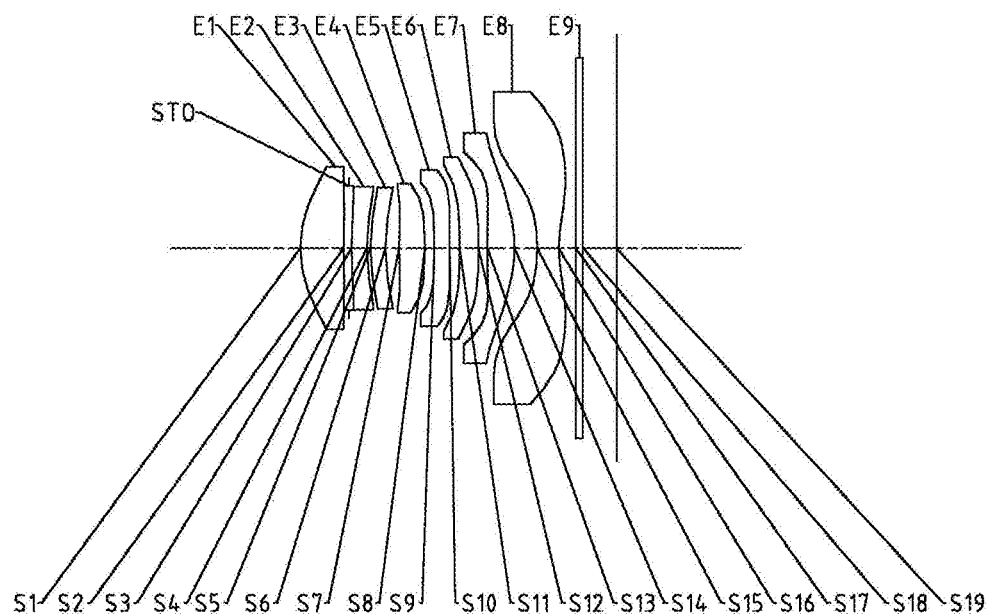
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 is a schematic structural view of the optical imaging lens assembly according to example 5 of the present disclosure.

As shown in FIG. 9, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 13 shows surface type, radius of curvature, thickness, material and conic coefficient of each lens of the optical imaging lens assembly in example 5, wherein the units for the radius of curvature and the thickness are millimeter (mm).

TABLE 13

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8251 | 0.6600 | 1.55 | 56.1 | −0.1101 |
| S2 | aspheric | 10.0113 | 0.0813 | | | −8.9013 |

TABLE 13-continued

| Surface number | Surface type | Radius of curvature | Thickness | Material Refractive index | Abbe number | Conic coefficient |
|---|---|---|---|---|---|---|
| STO | spherical | infinite | 0.0400 | | | |
| S3 | aspheric | 7.7026 | 0.2350 | 1.67 | 20.4 | −2.4561 |
| S4 | aspheric | 3.5226 | 0.0523 | | | −4.0487 |
| S5 | aspheric | 3.1352 | 0.2300 | 1.67 | 20.4 | −9.5004 |
| S6 | aspheric | 3.1379 | 0.2091 | | | −3.6746 |
| S7 | aspheric | 8.8954 | 0.3950 | 1.55 | 56.1 | 66.9608 |
| S8 | aspheric | −9.8800 | 0.1438 | | | 57.8640 |
| S9 | aspheric | 567.5397 | 0.2329 | 1.67 | 20.4 | 99.0000 |
| S10 | aspheric | 9.2690 | 0.1513 | | | 38.4843 |
| S11 | aspheric | −49.5263 | 0.2875 | 1.67 | 20.4 | −99.0000 |
| S12 | aspheric | −62.8292 | 0.1387 | | | −98.3749 |
| S13 | aspheric | 10.1945 | 0.4150 | 1.55 | 56.1 | 34.2666 |
| S14 | aspheric | −1.8993 | 0.3442 | | | −9.2588 |
| S15 | aspheric | −3.3936 | 0.3276 | 1.54 | 55.7 | −1.0330 |
| S16 | aspheric | 1.6689 | 0.2617 | | | −13.0220 |
| S17 | spherical | infinite | 0.1100 | 1.52 | 64.2 | |
| S18 | spherical | infinite | 0.5145 | | | |
| S19 | spherical | infinite | | | | |

As can be seen from Table 13, in example 5, the object-side surface and the image-side surface of any one of the first lens E1 to the eighth lens E8 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 |
|---|---|---|---|---|---|
| S1 | −9.6000E−03 | −4.1300E−03 | 4.2740E−03 | −4.6750E−02 | 1.0752E−01 |
| S2 | −5.1340E−02 | −1.2100E−01 | 5.9678E−01 | −1.3574E+00 | 1.9549E+00 |
| S3 | −3.9840E−02 | −2.4277E−01 | 9.6273E−01 | −1.6087E+00 | 1.2334E+00 |
| S4 | 1.2952E−01 | −8.8787E−01 | 2.6143E+00 | −5.1617E+00 | 6.6922E+00 |
| S5 | 1.5350E−01 | −7.4594E−01 | 1.9780E+00 | −4.4737E+00 | 7.6752E+00 |
| S6 | 1.5030E−03 | −6.9990E−02 | −1.1888E−01 | 1.5387E+00 | −6.5932E+00 |
| S7 | −9.8000E−02 | 1.4501E−01 | −1.5650E+00 | 7.3546E+00 | −2.1730E+01 |
| S8 | −1.3114E−01 | −5.8040E−02 | 2.4711E−01 | −1.7895E+00 | 5.3893E+00 |
| S9 | −2.0894E−01 | 1.4811E−01 | −1.1683E−01 | −1.1413E+00 | 3.8477E+00 |
| S10 | −1.9972E−01 | 1.5250E−01 | 2.7566E−01 | −1.7339E+00 | 3.6853E+00 |
| S11 | −1.3387E−01 | −1.4809E−01 | 1.1751E+00 | −3.0094E+00 | 4.3431E+00 |
| S12 | −1.1060E−01 | −3.1422E−01 | 1.2900E+00 | −2.5495E+00 | 3.0331E+00 |
| S13 | −8.6500E−03 | −3.0558E−01 | 7.1461E−01 | −1.0101E+00 | 8.8674E−01 |
| S14 | 1.2885E−02 | −6.9400E−02 | 8.3034E−02 | −3.6320E−02 | −1.2440E−02 |
| S15 | −2.6846E−01 | 2.5462E−01 | −2.1151E−01 | 1.4906E−01 | −6.7430E−02 |
| S16 | −1.4224E−01 | 1.1334E−01 | −7.1030E−02 | 3.1990E−02 | −1.0070E−02 |

| Surface number | A14 | A16 | A18 | A20 |
|---|---|---|---|---|
| S1 | −1.3169E−01 | 8.9225E−02 | −3.2320E−02 | 4.8560E−03 |
| S2 | −1.8468E+00 | 1.0985E+00 | −3.7157E−01 | 5.4378E−02 |
| S3 | 1.9207E−01 | −1.2435E+00 | 1.0034E+00 | −2.8246E−01 |
| S4 | −5.0626E+00 | 1.3397E+00 | 9.5428E−01 | −5.7943E−01 |
| S5 | −9.0434E+00 | 6.4746E+00 | −1.9960E+00 | −1.2050E−02 |
| S6 | 1.5492E+01 | −2.0819E+01 | 1.5061E+01 | −4.5155E+00 |
| S7 | 4.0369E+01 | −4.5707E+01 | 2.8724E+01 | −7.5971E+00 |
| S8 | −8.8707E+00 | 8.5874E+00 | −4.6504E+00 | 1.1076E+00 |
| S9 | −5.8531E+00 | 4.9362E+00 | −2.2405E+00 | 4.1475E−01 |
| S10 | −4.3411E+00 | 2.9600E+00 | −1.1019E+00 | 1.7476E−01 |
| S11 | −3.8070E+00 | 1.9736E+00 | −5.5078E−01 | 6.3602E−02 |
| S12 | −2.2601E+00 | 1.0305E+00 | −2.6161E−01 | 2.8234E−02 |
| S13 | −5.0196E−01 | 1.7812E−01 | −3.6010E−02 | 3.2000E−03 |
| S14 | 2.0465E−02 | −8.8300E−03 | 1.7050E−03 | −1.3000E−04 |
| S15 | 1.8537E−02 | −3.0300E−03 | 2.7200E−04 | −1.0000E−05 |
| S16 | 2.1240E−03 | −2.8000E−04 | 2.1900E−05 | −7.4000E−07 |

Table 15 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 5.

TABLE 15

| f1 (mm) | 3.98 | f7 (mm) | 2.97 |
|---|---|---|---|
| f2 (mm) | −9.97 | f8 (mm) | −2.04 |
| f3 (mm) | 156.18 | f (mm) | 4.00 |
| f4 (mm) | 8.64 | TTL (mm) | 4.83 |
| f5 (mm) | −14.16 | ImgH (mm) | 3.26 |
| f6 (mm) | −354.42 | FOV (°) | 77.1 |

Figure 10A:
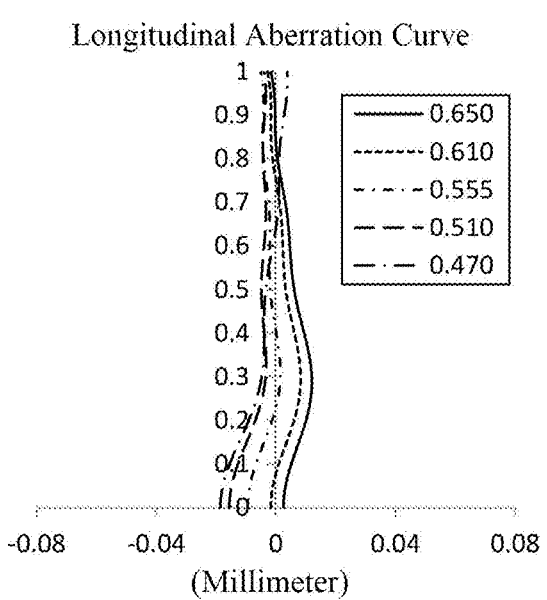
FIGS. 10A to 10D illustrate a longitudinal aberration curve, an astigmatic curve, a distortion curve and a lateral color curve of the optical imaging lens assembly of the Example 5, respectively.
Figure 10B:
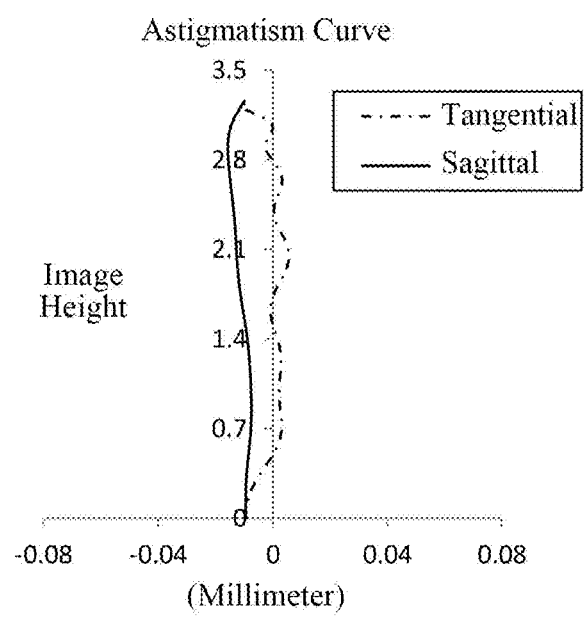
Figure 10C:
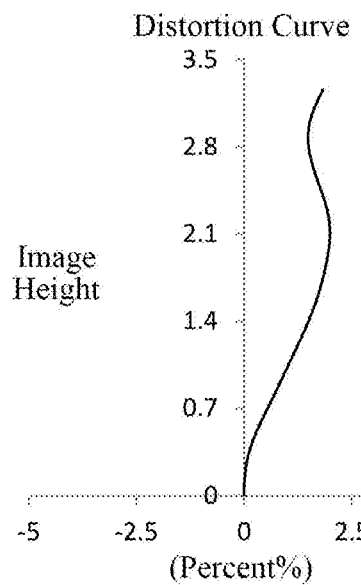
Figure 10D:
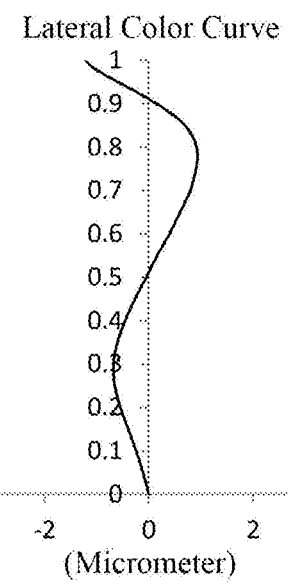

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatism curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion at different field of view. FIG. 10D illustrates a lateral color curve of the optical imaging lens assembly according to example 5, representing deviations of different image heights on an imaging plane after light passes through the optical imaging lens assembly. It can be seen from FIG. 10A to FIG. 10D that the optical imaging lens assembly provided in example 5 may achieve good image quality.

Example 6

Figure 11:
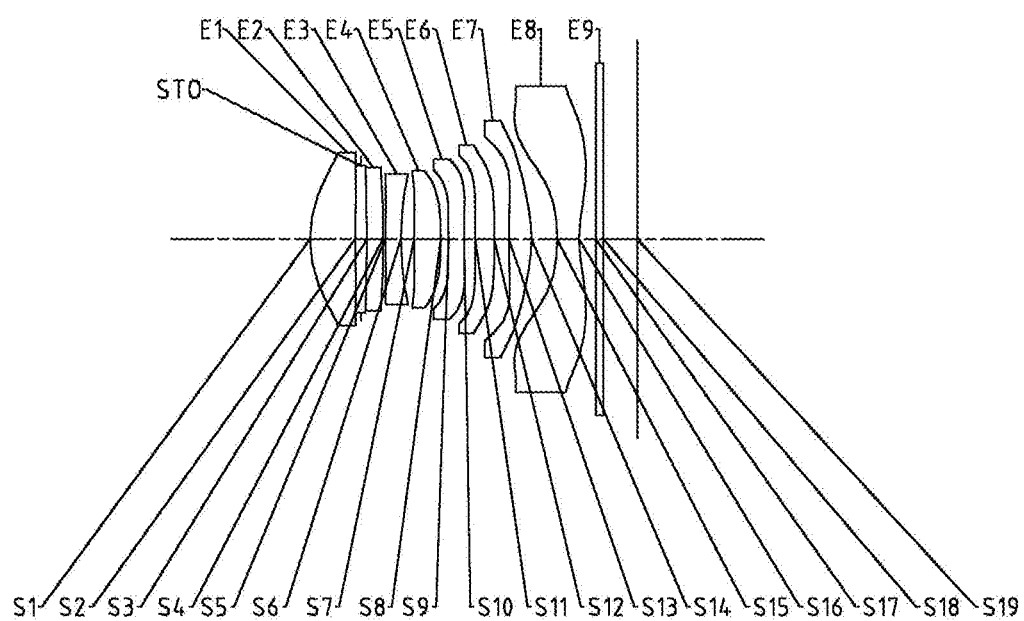
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 is a schematic structural view of the optical imaging lens assembly according to example 6 of the present disclosure.

As shown in FIG. 11, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a concave surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a convex surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 16 shows surface type, radius of curvature, thickness, material and conic coefficient of each lens of the optical imaging lens assembly in example 6, wherein the units for the radius of curvature and the thickness are millimeter (mm).

TABLE 16

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8150 | 0.6650 | 1.55 | 56.1 | −0.1126 |
| S2 | aspheric | 10.6100 | 0.0859 | | | 14.0724 |
| STO | spherical | infinite | 0.0888 | | | |
| S3 | aspheric | −75.7663 | 0.2350 | 1.67 | 20.4 | −96.1793 |
| S4 | aspheric | −402.5860 | 0.0350 | | | −99.0000 |
| S5 | aspheric | 12.9754 | 0.2300 | 1.67 | 20.4 | −54.4846 |
| S6 | aspheric | 4.1623 | 0.1946 | | | 0.2338 |
| S7 | aspheric | 10.0556 | 0.3950 | 1.55 | 56.1 | 76.0496 |
| S8 | aspheric | −9.8622 | 0.1144 | | | 64.2839 |
| S9 | aspheric | 12.3153 | 0.2300 | 1.67 | 20.4 | 25.4207 |
| S10 | aspheric | 7.8052 | 0.1627 | | | 6.1250 |
| S11 | aspheric | 13.9287 | 0.2792 | 1.67 | 20.4 | −8.1695 |
| S12 | aspheric | 11.0809 | 0.2173 | | | −96.1153 |
| S13 | aspheric | 9.9433 | 0.3338 | 1.55 | 56.1 | 32.3995 |
| S14 | aspheric | −2.0721 | 0.3779 | | | −22.9247 |
| S15 | aspheric | −3.4417 | 0.3218 | 1.54 | 55.7 | −1.1453 |
| S16 | aspheric | 1.7572 | 0.2504 | | | −11.0079 |
| S17 | spherical | infinite | 0.1100 | 1.52 | 64.2 | |
| S18 | spherical | infinite | 0.5032 | | | |
| S19 | spherical | infinite | | | | |

As can be seen from Table 16, in example 6, the object-side surface and the image-side surface of any one of the first lens E1 to the eighth lens E8 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 |
|---|---|---|---|---|---|
| S1 | −1.1510E−02 | 8.9210E−03 | −4.1870E−02 | 5.9210E−02 | −5.4510E−02 |
| S2 | −3.8780E−02 | −1.6420E−02 | 1.0522E−01 | −2.6815E−01 | 4.1372E−01 |
| S3 | −4.6480E−02 | 4.0731E−02 | 7.8391E−02 | −4.3480E−01 | 1.0867E+00 |
| S4 | 1.8721E−02 | −1.5095E−01 | 3.4597E−01 | −1.3444E+00 | 3.9593E+00 |

TABLE 17-continued

| | | | | | |
|---|---|---|---|---|---|
| S5 | 4.1010E−02 | −1.9367E−01 | 2.8545E−01 | −1.3483E+00 | 4.7550E+00 |
| S6 | −6.4500E−03 | −5.8350E−02 | 2.9341E−01 | −1.2622E+00 | 3.0574E+00 |
| S7 | −1.0465E−01 | 2.4375E−01 | −1.4681E+00 | 5.2362E+00 | −1.2412E+01 |
| S8 | −2.1128E−01 | 2.0365E−01 | −5.7228E−01 | 1.2978E+00 | −2.3859E+00 |
| S9 | −2.7187E−01 | 3.1710E−01 | −1.1256E+00 | 2.3694E+00 | −2.9814E+00 |
| S10 | −1.7170E−01 | 2.5596E−01 | −5.4869E−01 | 3.4752E−01 | 6.3088E−01 |
| S11 | −2.0297E−01 | 3.7872E−01 | −4.6971E−01 | 8.9148E−02 | 4.4808E−01 |
| S12 | −2.2004E−01 | 1.8922E−01 | −6.5880E−02 | −2.3978E−01 | 4.5060E−01 |
| S13 | 4.7420E−03 | −1.3478E−01 | 1.3399E−01 | −9.5720E−02 | 2.6291E−02 |
| S14 | −6.3530E−02 | 2.4191E−01 | −5.5550E−01 | 7.1382E−01 | −5.4420E−01 |
| S15 | −1.9600E−01 | 5.4397E−02 | 1.2690E−02 | 9.1750E−03 | −1.3590E−02 |
| S16 | −1.4263E−01 | 9.1659E−02 | −4.4400E−02 | 1.6134E−02 | −4.4400E−03 |

| Surface number | A14 | A16 | A18 | A20 |
|---|---|---|---|---|
| S1 | 2.4989E−02 | −3.5800E−03 | −1.3800E−03 | 4.7400E−04 |
| S2 | −3.9853E−01 | 2.3337E−01 | −7.6150E−02 | 1.0678E−02 |
| S3 | −1.5710E+00 | 1.3224E+00 | −6.0461E−01 | 1.1690E−01 |
| S4 | −6.6086E+00 | 6.1906E+00 | −3.0726E+00 | 6.3308E−01 |
| S5 | −8.5753E+00 | 8.4075E+00 | −4.3121E+00 | 9.0644E−01 |
| S6 | −3.9284E+00 | 2.5433E+00 | −5.7403E−01 | −6.2120E−02 |
| S7 | 1.8978E+01 | −1.8018E+01 | 9.7196E+00 | −2.2656E+00 |
| S8 | 3.2367E+00 | −2.9297E+00 | 1.5608E+00 | −3.6607E−01 |
| S9 | 2.0163E+00 | −4.3370E−01 | −2.3536E−01 | 1.0870E−01 |
| S10 | −1.5731E+00 | 1.4413E+00 | −6.3620E−01 | 1.1292E−01 |
| S11 | −5.9038E−01 | 3.2084E−01 | −7.8900E−02 | 6.9550E−03 |
| S12 | −3.6620E−01 | 1.5570E−01 | −3.2710E−02 | 2.5690E−03 |
| S13 | 2.0525E−02 | −2.5140E−02 | 1.0115E−02 | −1.4300E−03 |
| S14 | 2.5038E−01 | −6.8280E−02 | 1.0187E−02 | −6.4000E−04 |
| S15 | 5.4530E−03 | −1.0700E−03 | 1.0700E−04 | −4.4000E−06 |
| S16 | 8.7900E−04 | −1.2000E−04 | 9.1700E−06 | −3.3000E−07 |

Table 18 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 6.

TABLE 18

| | | | |
|---|---|---|---|
| f1 (mm) | 3.91 | f7 (mm) | 3.17 |
| f2 (mm) | −140.23 | f8 (mm) | −2.12 |
| f3 (mm) | −9.30 | f (mm) | 3.95 |
| f4 (mm) | 9.18 | TTL (mm) | 4.83 |
| f5 (mm) | −32.68 | ImgH (mm) | 2.93 |
| f6 (mm) | −84.73 | FOV (°) | 72.6 |

Figure 12A:
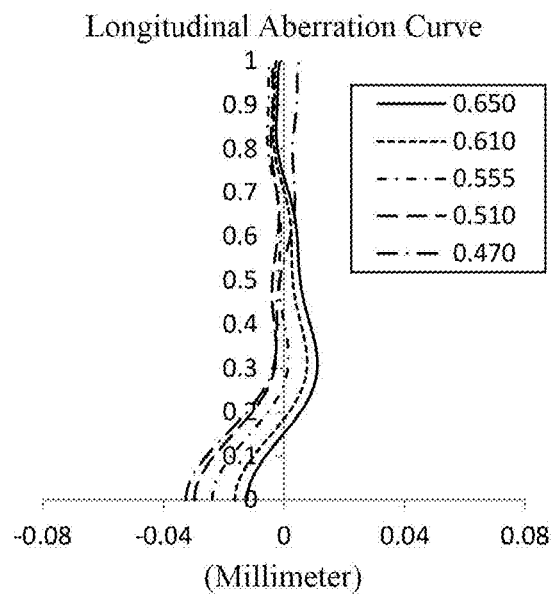
FIGS. 12A to 12D illustrate a longitudinal aberration curve, an astigmatic curve, a distortion curve and a lateral color curve of the optical imaging lens assembly of the Example 6, respectively.
Figure 12B:
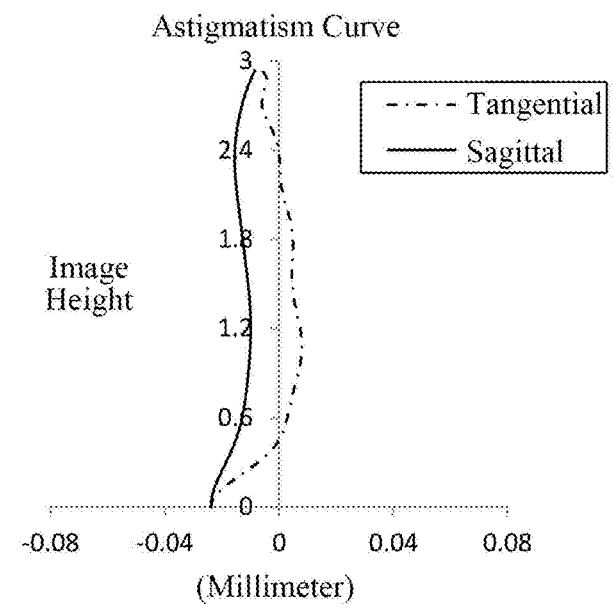
Figure 12C:
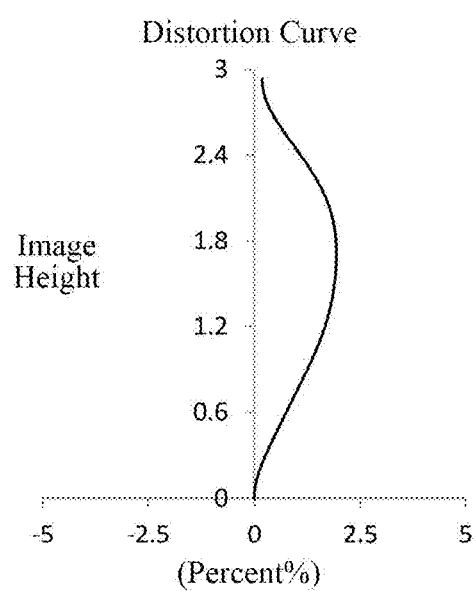
Figure 12D:
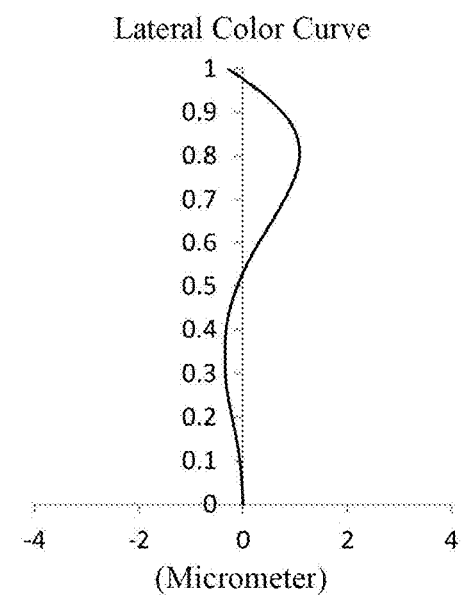

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatism curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion at different field of view. FIG. 12D illustrates a lateral color curve of the optical imaging lens assembly according to example 6, representing deviations of different image heights on an imaging plane after light passes through the optical imaging lens assembly. It can be seen from FIG. 12A to FIG. 12D that the optical imaging lens assembly provided in example 6 may achieve good image quality.

Example 7

An optical imaging lens assembly according to example 7 of the present disclosure is described below with reference to FIG. 13 to FIG. 14D. FIG. 13 is a schematic structural view of the optical imaging lens assembly according to example 7 of the present disclosure.

As shown in FIG. 13, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a concave surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a convex surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 19 shows surface type, radius of curvature, thickness, material and conic coefficient of each lens of the optical imaging lens assembly in example 7, wherein the units for the radius of curvature and the thickness are millimeter (mm).

TABLE 19

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8456 | 0.6537 | 1.55 | 56.1 | −0.1288 |
| S2 | aspheric | 13.4064 | 0.0790 | | | 28.9758 |
| STO | spherical | infinite | 0.0830 | | | |
| S3 | aspheric | −491.8010 | 0.2350 | 1.67 | 20.4 | −99.0000 |
| S4 | aspheric | 9.4386 | 0.0350 | | | −23.3995 |
| S5 | aspheric | 5.3846 | 0.2300 | 1.67 | 20.4 | −19.9548 |
| S6 | aspheric | 3.9481 | 0.2115 | | | 0.8729 |
| S7 | aspheric | 9.9285 | 0.3904 | 1.55 | 56.1 | 70.0670 |
| S8 | aspheric | −9.9856 | 0.1026 | | | 65.6380 |

TABLE 19-continued

| Surface number | Surface type | Radius of curvature | Thickness | Material Refractive index | Material Abbe number | Conic coefficient |
|---|---|---|---|---|---|---|
| S9 | aspheric | 13.3921 | 0.2316 | 1.67 | 20.4 | 9.4624 |
| S10 | aspheric | 9.0399 | 0.1756 | | | 6.5359 |
| S11 | aspheric | 22.5080 | 0.2500 | 1.67 | 20.4 | 60.0963 |
| S12 | aspheric | 11.8880 | 0.2219 | | | −99.0000 |
| S13 | aspheric | 9.7507 | 0.3648 | 1.55 | 56.1 | 32.3567 |
| S14 | aspheric | −2.0485 | 0.3749 | | | −21.2950 |
| S15 | aspheric | −3.3846 | 0.3269 | 1.54 | 55.7 | −1.1194 |
| S16 | aspheric | 1.7505 | 0.2506 | | | −10.9739 |
| S17 | spherical | infinite | 0.1100 | 1.52 | 64.2 | |
| S18 | spherical | infinite | 0.5034 | | | |
| S19 | spherical | infinite | | | | |

As can be seen from Table 19, in example 7, the object-side surface and the image-side surface of any one of the first lens E1 to the eighth lens E8 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 |
|---|---|---|---|---|---|
| S1 | −1.2810E−02 | 3.7530E−03 | −2.7480E−02 | 2.7024E−02 | −9.3500E−03 |
| S2 | −4.4910E−02 | −2.1010E−02 | 1.8071E−01 | −4.6625E−01 | 7.0588E−01 |
| S3 | −5.3370E−02 | 7.1669E−02 | −6.3700E−03 | −1.8554E−01 | 5.2613E−01 |
| S4 | 1.4814E−02 | −1.9408E−01 | 6.9540E−01 | −2.9440E+00 | 7.6816E+00 |
| S5 | 4.6192E−02 | −1.9492E−01 | 5.5552E−01 | −2.9530E+00 | 8.7412E+00 |
| S6 | −1.0810E−02 | −1.0047E−01 | 7.9780E−01 | −3.4857E+00 | 8.5119E+00 |
| S7 | −1.0619E−01 | 1.4868E−01 | −9.6995E−01 | 3.5809E+00 | −8.7695E+00 |
| S8 | −2.0752E−01 | 1.4012E−01 | −2.7974E−01 | 3.6432E−01 | −3.8217E−01 |
| S9 | −2.7649E−01 | 3.4215E−01 | −1.3004E+00 | 2.9605E+00 | −4.0024E+00 |
| S10 | −1.5356E−01 | 1.2677E−01 | −1.4453E−01 | −4.0713E−01 | 1.5763E+00 |
| S11 | −1.8947E−01 | 2.6776E−01 | −1.0345E−01 | −6.0654E−01 | 1.3790E+00 |
| S12 | −2.0787E−01 | 1.2211E−01 | 1.5378E−01 | −6.5264E−01 | 9.8613E−01 |
| S13 | 1.1424E−02 | −1.5693E−01 | 1.6840E−01 | −1.3634E−01 | 7.4135E−02 |
| S14 | −6.5540E−02 | 2.4689E−01 | −5.8427E−01 | 7.6178E−01 | −5.8569E−01 |
| S15 | −1.9280E−01 | 5.1193E−02 | 1.6522E−02 | 4.5690E−03 | −1.0550E−02 |
| S16 | −1.4306E−01 | 9.1652E−02 | −4.3050E−02 | 1.4437E−02 | −3.4200E−03 |

| Surface number | A14 | A16 | A18 | A20 |
|---|---|---|---|---|
| S1 | −1.4100E−02 | 1.6633E−02 | −6.8200E−03 | 1.0350E−03 |
| S2 | −6.6255E−01 | 3.7771E−01 | −1.1978E−01 | 1.6230E−02 |
| S3 | −7.8913E−01 | 6.7978E−01 | −3.1787E−01 | 6.3041E−02 |
| S4 | −1.1556E+01 | 1.0069E+01 | −4.7583E+00 | 9.4863E−01 |
| S5 | −1.3947E+01 | 1.2624E+01 | −6.1555E+00 | 1.2583E+00 |
| S6 | −1.2051E+01 | 9.9499E+00 | −4.4005E+00 | 7.9668E−01 |
| S7 | 1.3705E+01 | −1.3170E+01 | 7.1646E+00 | −1.6817E+00 |
| S8 | 4.5132E−01 | −5.2573E−01 | 3.9718E−01 | −1.2714E−01 |
| S9 | 2.8676E+00 | −5.9364E−01 | −4.4482E−01 | 2.0892E−01 |
| S10 | −2.4146E+00 | 1.9632E+00 | −8.3514E−01 | 1.4705E−01 |
| S11 | −1.4668E+00 | 8.4839E−01 | −2.5455E−01 | 3.1119E−02 |
| S12 | −8.3278E−01 | 4.0496E−01 | −1.0491E−01 | 1.1187E−02 |
| S13 | −2.2130E−02 | −3.2900E−03 | 4.4510E−03 | −8.4000E−04 |
| S14 | 2.7177E−01 | −7.4930E−02 | 1.1330E−02 | −7.3000E−04 |
| S15 | 4.3370E−03 | −8.4000E−04 | 8.0600E−05 | −3.1000E−06 |
| S16 | 5.3400E−04 | −5.0000E−05 | 2.5300E−06 | −5.8000E−08 |

Table 21 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 7.

TABLE 21

| | | | |
|---|---|---|---|
| f1 (mm) | 3.84 | f7 (mm) | 3.13 |
| f2 (mm) | −13.91 | f8 (mm) | −2.10 |
| f3 (mm) | −23.75 | f (mm) | 3.94 |
| f4 (mm) | 9.18 | TTL (mm) | 4.83 |
| f5 (mm) | −42.69 | ImgH (mm) | 2.93 |
| f6 (mm) | −38.21 | FOV (°) | 72.3 |

Figure 14C:
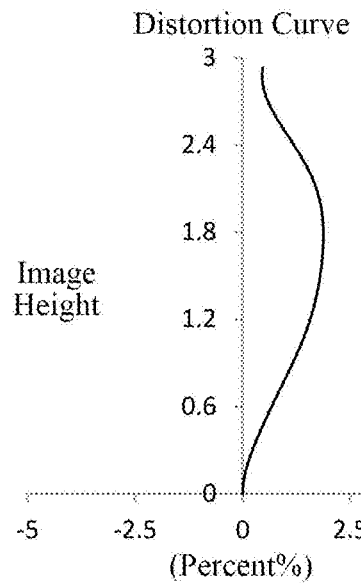
Figure 14D:
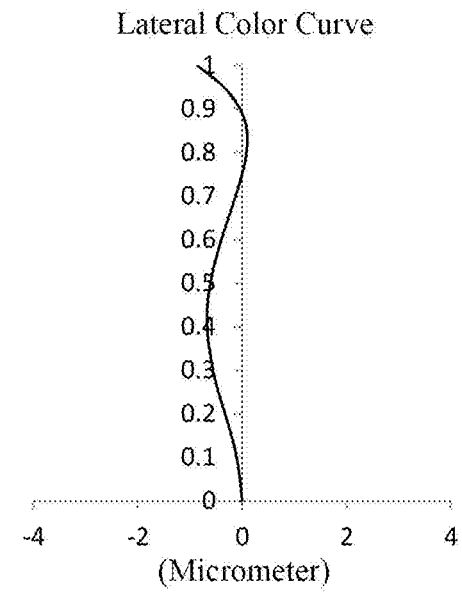

FIG. 14A illustrates a longitudinal aberration curve of the optical imaging lens assembly according to example 7, representing deviations of focal points converged by light of different wavelengths after passing through the optical imaging lens assembly. FIG. 14B illustrates an astigmatism curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion at different field of view. FIG. 14D illustrates a lateral color curve of the optical imaging lens assembly according to example 7, representing deviations of different image heights on an imaging plane after light passes through the optical imaging lens assembly. It can be seen from FIG. 14A to FIG. 14D that the optical imaging lens assembly provided in example 7 may achieve good image quality.

Example 8

Figure 15:
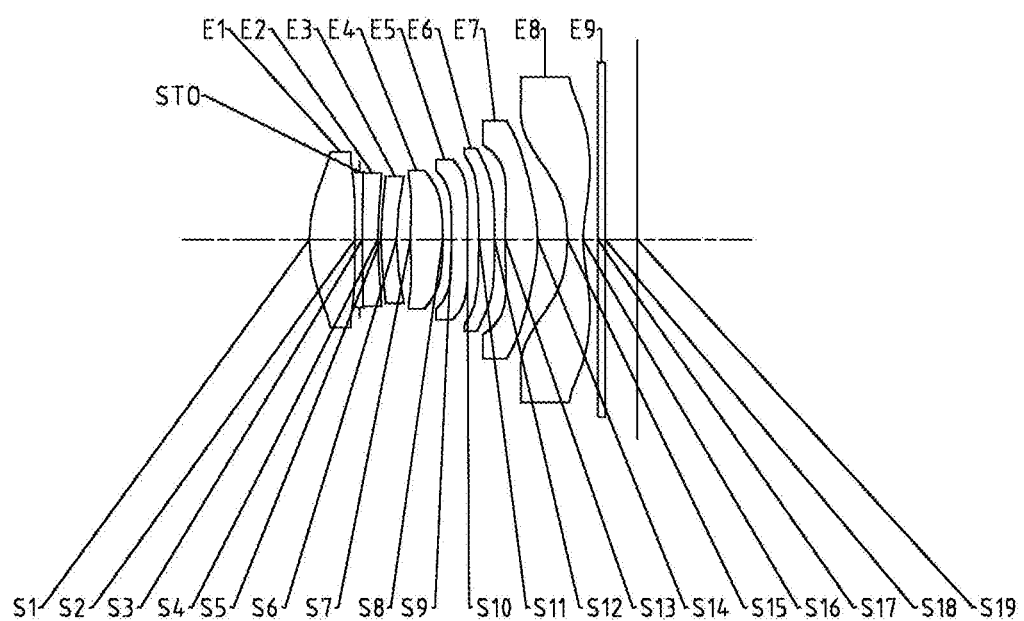
FIG. 15 illustrates a schematic structural view of an optical imaging lens assembly according to Example 8 of the present disclosure.

An optical imaging lens assembly according to example 8 of the present disclosure is described below with reference to FIG. 15 to FIG. 16D. FIG. 15 is a schematic structural view of the optical imaging lens assembly according to example 8 of the present disclosure.

As shown in FIG. 15, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a convex surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 22 shows surface type, radius of curvature, thickness, material and conic coefficient of each lens of the optical imaging lens assembly in example 8, wherein the units for the radius of curvature and the thickness are millimeter (mm).

TABLE 22

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 2.1023 | 0.6764 | 1.55 | 56.1 | −0.2464 |
| S2 | aspheric | −3585.2000 | 0.0675 | | | −99.0000 |
| STO | spherical | infinite | 0.0400 | | | |
| S3 | aspheric | 16.3340 | 0.2300 | 1.67 | 20.4 | 71.9946 |
| S4 | aspheric | 5.6741 | 0.0458 | | | −14.1134 |
| S5 | aspheric | 4.6286 | 0.2300 | 1.67 | 20.4 | −13.5273 |
| S6 | aspheric | 3.4244 | 0.2070 | | | −2.9097 |
| S7 | aspheric | 8.6280 | 0.4787 | 1.55 | 56.1 | 64.1005 |
| S8 | aspheric | −9.4915 | 0.1310 | | | 74.7620 |
| S9 | aspheric | 18.0619 | 0.2303 | 1.67 | 20.4 | −99.0000 |
| S10 | aspheric | 10.1855 | 0.1739 | | | 30.1546 |
| S11 | aspheric | 34.2080 | 0.2300 | 1.67 | 20.4 | 99.0000 |
| S12 | aspheric | 24.4607 | 0.1557 | | | −71.6921 |
| S13 | aspheric | 9.8562 | 0.4816 | 1.55 | 56.1 | 2.5438 |
| S14 | aspheric | −2.1161 | 0.4380 | | | −22.1978 |
| S15 | aspheric | −3.1275 | 0.2300 | 1.54 | 55.7 | −1.0892 |
| S16 | aspheric | 1.6793 | 0.2207 | | | −12.4495 |
| S17 | spherical | infinite | 0.1100 | 1.52 | 64.2 | |
| S18 | spherical | infinite | 0.4735 | | | |
| S19 | spherical | infinite | | | | |

As can be seen from Table 22, in example 8, the object-side surface and the image-side surface of any one of the first lens E1 to the eighth lens E8 are aspheric. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 |
|---|---|---|---|---|---|
| S1 | −1.1980E−02 | −1.4760E−02 | 2.8183E−02 | −7.5120E−02 | 9.7643E−02 |
| S2 | −5.2740E−02 | −2.4290E−02 | 1.9797E−01 | −3.8389E−01 | 4.1432E−01 |
| S3 | −5.5470E−02 | −1.1868E−01 | 5.7072E−01 | −9.9241E−01 | 1.1921E+00 |
| S4 | 8.6632E−02 | −6.2810E−01 | 1.0042E+00 | 2.9978E−01 | −3.3394E+00 |

TABLE 23-continued

| | | | | | |
|---|---|---|---|---|---|
| S5 | 1.2610E-01 | -4.6525E-01 | -7.6170E-02 | 3.4238E+00 | -9.7096E+00 |
| S6 | 5.4400E-04 | -1.2100E-02 | -2.4362E-01 | 9.6408E-01 | -2.4327E+00 |
| S7 | -1.0644E-01 | 7.7428E-02 | -7.0658E-01 | 3.0268E+00 | -8.6350E+00 |
| S8 | -1.7266E-01 | -4.4630E-02 | -1.2880E-02 | 2.6793E-01 | -8.3078E-01 |
| S9 | -2.1367E-01 | 3.6769E-02 | -1.2672E-01 | -3.8508E-01 | 2.2937E+00 |
| S10 | -1.8247E-01 | 2.2615E-01 | -4.1357E-01 | 3.8471E-01 | 6.5496E-02 |
| S11 | -2.0609E-01 | 1.7399E-01 | 3.5454E-01 | -1.5327E+00 | 2.5809E+00 |
| S12 | -1.6814E-01 | -1.4308E-01 | 1.0248E+00 | -2.3990E+00 | 3.2304E+00 |
| S13 | 3.1732E-02 | -3.6731E-01 | 8.8137E-01 | -1.4662E+00 | 1.6080E+00 |
| S14 | -5.7270E-02 | 1.5740E-01 | -3.2054E-01 | 3.9068E-01 | -2.8926E-01 |
| S15 | -2.3924E-01 | 1.5703E-01 | -8.5210E-02 | 6.0241E-02 | -2.9660E-02 |
| S16 | -1.4729E-01 | 1.0743E-01 | -5.6960E-02 | 2.1819E-02 | -5.9900E-03 |

| Surface number | A14 | A16 | A18 | A20 |
|---|---|---|---|---|
| S1 | -7.6540E-02 | 3.4919E-02 | -8.5800E-03 | 8.8800E-04 |
| S2 | -2.8115E-01 | 1.1887E-01 | -2.8620E-02 | 2.9990E-03 |
| S3 | -1.2657E+00 | 1.1346E+00 | -6.3897E-01 | 1.5545E-01 |
| S4 | 5.1248E+00 | -3.5581E+00 | 1.0720E+00 | -6.2380E-02 |
| S5 | 1.4506E+01 | -1.2883E+01 | 6.5855E+00 | -1.5273E+00 |
| S6 | 4.5451E+00 | -5.8477E+00 | 4.4400E+00 | -1.4343E+00 |
| S7 | 1.5642E+01 | -1.7480E+01 | 1.1048E+01 | -2.9831E+00 |
| S8 | 1.4743E+00 | -1.4809E+00 | 7.9005E-01 | -1.7230E-01 |
| S9 | -4.7874E+00 | 5.2884E+00 | -3.0566E+00 | 7.1788E-01 |
| S10 | -6.8385E-01 | 7.9050E-01 | -4.0035E-01 | 7.8953E-02 |
| S11 | -2.4951E+00 | 1.3860E+00 | -4.0358E-01 | 4.7257E-02 |
| S12 | -2.6744E+00 | 1.3283E+00 | -3.6005E-01 | 4.0780E-02 |
| S13 | -1.1518E+00 | 5.1316E-01 | -1.2899E-01 | 1.4042E-02 |
| S14 | 1.3066E-01 | -3.5200E-02 | 5.2030E-03 | -3.3000E-04 |
| S15 | 8.5130E-03 | -1.4000E-03 | 1.2200E-04 | -4.4000E-06 |
| S16 | 1.1230E-03 | -1.4000E-04 | 9.4200E-06 | -2.9000E-07 |

Table 24 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 8.

TABLE 24

| f1 (mm) | 3.85 | f7 (mm) | 3.24 |
|---|---|---|---|
| f2 (mm) | -13.17 | f8 (mm) | -2.00 |
| f3 (mm) | -21.41 | f (mm) | 3.87 |
| f4 (mm) | 8.36 | TTL (mm) | 4.85 |
| f5 (mm) | -35.50 | ImgH (mm) | 2.93 |
| f6 (mm) | -130.18 | FOV (°) | 73.1 |

Figure 16A:
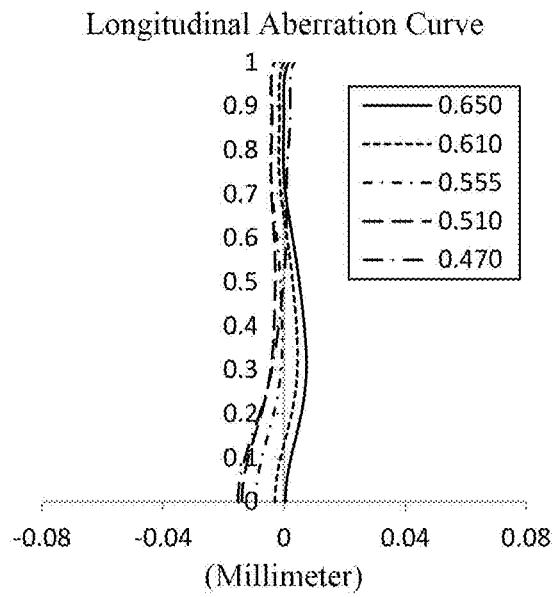
FIGS. 16A to 16D illustrate a longitudinal aberration curve, an astigmatic curve, a distortion curve and a lateral color curve of the optical imaging lens assembly of the Example 8, respectively.
Figure 16B:
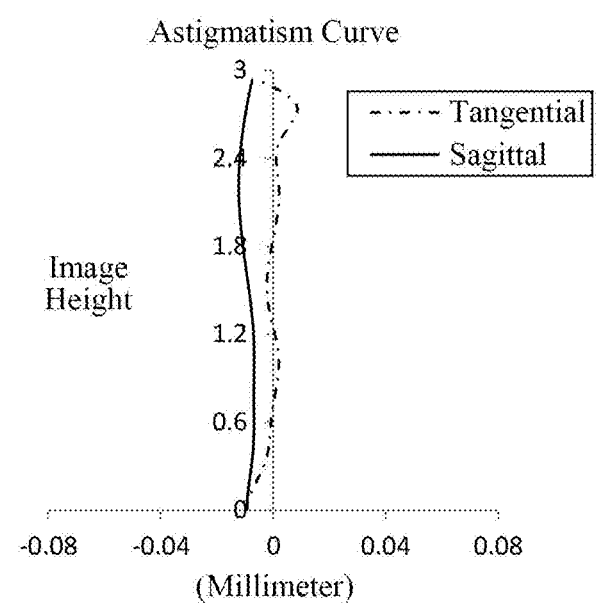
Figure 16C:
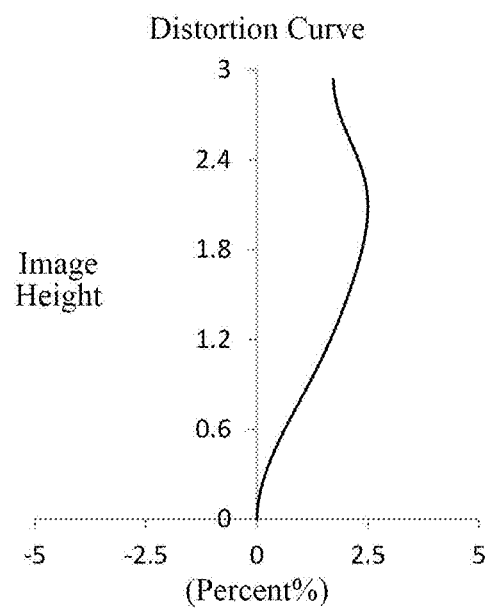
Figure 16D:
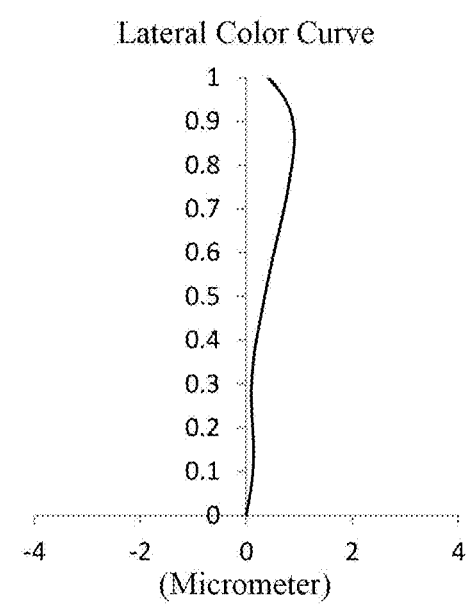

FIG. 16A illustrates a longitudinal aberration curve of the optical imaging lens assembly according to example 8, representing deviations of focal points converged by light of different wavelengths after passing through the optical imaging lens assembly. FIG. 16B illustrates an astigmatism curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion at different field of view. FIG. 16D illustrates a lateral color curve of the optical imaging lens assembly according to example 8, representing deviations of different image heights on an imaging plane after light passes through the optical imaging lens assembly. It can be seen from FIG. 16A to FIG. 16D that the optical imaging lens assembly provided in example 8 may achieve good image quality.

Example 9

Figure 17:
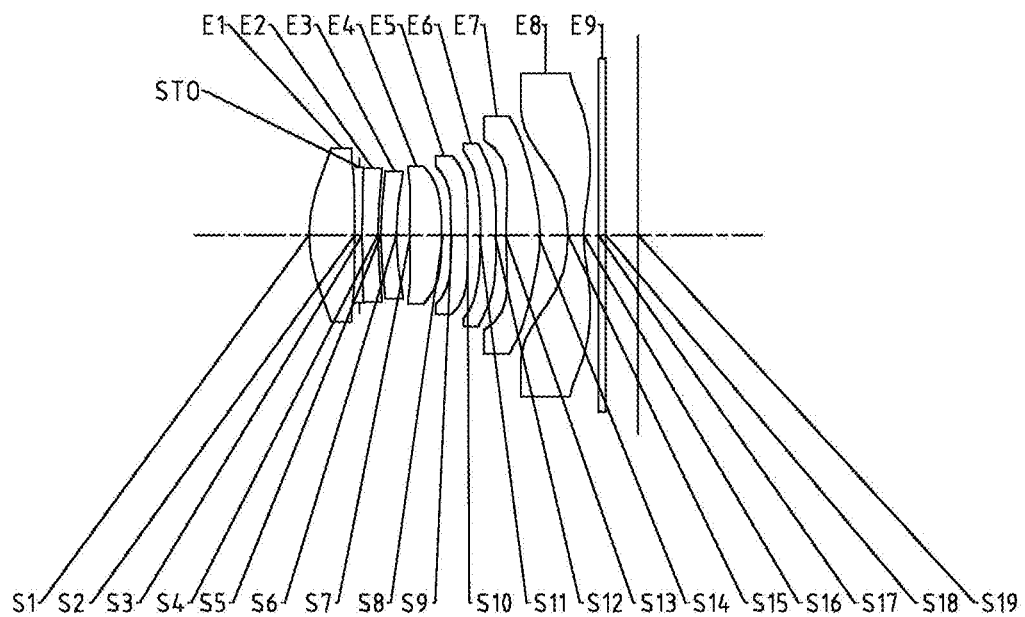
FIG. 17 illustrates a schematic structural view of an optical imaging lens assembly according to Example 9 of the present disclosure.

An optical imaging lens assembly according to example 9 of the present disclosure is described below with reference to FIG. 17 to FIG. 18D. FIG. 17 is a schematic structural view of the optical imaging lens assembly according to example 9 of the present disclosure.

As shown in FIG. 17, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 25 shows surface type, radius of curvature, thickness, material and conic coefficient of each lens of the optical imaging lens assembly in example 9, wherein the units for the radius of curvature and the thickness are millimeter (mm).

TABLE 25

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 2.0394 | 0.6736 | 1.55 | 56.1 | −0.2272 |
| S2 | aspheric | 55.7663 | 0.0704 | | | −31.2116 |
| STO | spherical | infinite | 0.0400 | | | |
| S3 | aspheric | 15.5406 | 0.2300 | 1.67 | 20.4 | 67.3490 |
| S4 | aspheric | 5.3229 | 0.0418 | | | −12.9427 |
| S5 | aspheric | 4.6900 | 0.2300 | 1.67 | 20.4 | −14.4486 |
| S6 | aspheric | 3.6036 | 0.1975 | | | −2.7408 |
| S7 | aspheric | 8.4796 | 0.4733 | 1.55 | 56.1 | 64.3920 |
| S8 | aspheric | −9.7792 | 0.1373 | | | 74.6431 |

TABLE 25-continued

| Surface number | Surface type | Radius of curvature | Thickness | Material Refractive index | Abbe number | Conic coefficient |
|---|---|---|---|---|---|---|
| S9 | aspheric | 17.7411 | 0.2500 | 1.67 | 20.4 | −83.1366 |
| S10 | aspheric | 21.2736 | 0.1840 | | | 70.4433 |
| S11 | aspheric | −37.4191 | 0.2300 | 1.67 | 20.4 | −99.0000 |
| S12 | aspheric | 25.3518 | 0.1492 | | | −13.2729 |
| S13 | aspheric | 9.7709 | 0.5002 | 1.55 | 56.1 | 3.1001 |
| S14 | aspheric | −2.1031 | 0.4084 | | | −22.7851 |
| S15 | aspheric | −3.1180 | 0.2300 | 1.54 | 55.7 | −1.0957 |
| S16 | aspheric | 1.6491 | 0.2208 | | | −12.6483 |
| S17 | spherical | infinite | 0.1100 | 1.52 | 64.2 | |
| S18 | spherical | infinite | 0.4736 | | | |
| S19 | spherical | infinite | | | | |

As can be seen from Table 25, in example 9, the object-side surface and the image-side surface of any one of the first lens E1 to the eighth lens E8 are aspheric. Table 26 shows high-order coefficients applicable to each aspheric surface in example 9, wherein the surface shape of each aspheric surface may be defined by the formula (1) given in the above example 1.

TABLE 26

| Surface number | A4 | A6 | A8 | A10 | A12 |
|---|---|---|---|---|---|
| S1 | −1.1620E−02 | −1.2800E−02 | 2.0714E−02 | −5.8080E−02 | 7.5255E−02 |
| S2 | −5.3520E−02 | −2.4120E−02 | 1.9997E−01 | −3.9028E−01 | 4.2383E−01 |
| S3 | −5.5280E−02 | −1.3142E−01 | 6.9275E−01 | −1.3920E+00 | 1.8410E+00 |
| S4 | 9.6280E−02 | −7.2088E−01 | 1.4707E+00 | −9.4633E−01 | −1.5806E+00 |
| S5 | 1.3515E−01 | −5.8280E−01 | 4.4824E−01 | 2.0947E+00 | −7.7348E+00 |
| S6 | 5.2880E−03 | −8.2570E−02 | 1.4123E−01 | −3.6079E−01 | 6.1126E−01 |
| S7 | −1.0764E−01 | 1.4166E−01 | −1.1315E+00 | 4.5219E+00 | −1.1799E+01 |
| S8 | −1.7527E−01 | −3.7430E−02 | −1.0810E−02 | 2.1948E−01 | −7.3344E−01 |
| S9 | −2.2725E−01 | 1.6758E−01 | −8.2025E−01 | 1.8590E+00 | −2.3225E+00 |
| S10 | −1.8477E−01 | 3.1637E−01 | −8.7260E−01 | 1.6117E+00 | −1.8734E+00 |
| S11 | −2.1947E−01 | 2.9257E−01 | −1.1205E−01 | −5.5094E−01 | 1.3877E+00 |
| S12 | −1.8383E−01 | 2.9420E−03 | 4.9491E−01 | −1.3500E+00 | 1.9774E+00 |
| S13 | 2.5827E−02 | −3.1411E−01 | 7.1213E−01 | −1.1909E+00 | 1.3360E+00 |
| S14 | −6.1730E−02 | 1.8126E−01 | −3.6601E−01 | 4.3406E−01 | −3.1196E−01 |
| S15 | −2.4042E−01 | 1.6043E−01 | −9.0230E−02 | 6.4379E−02 | −3.1610E−02 |
| S16 | −1.4871E−01 | 1.1001E−01 | −5.9500E−02 | 2.3372E−02 | −6.6100E−03 |

| Surface number | A14 | A16 | A18 | A20 |
|---|---|---|---|---|
| S1 | −5.8840E−02 | 2.6532E−02 | −6.3900E−03 | 6.4600E−04 |
| S2 | −2.8939E−01 | 1.2322E−01 | −2.9930E−02 | 3.1680E−03 |
| S3 | −1.8117E+00 | 1.3118E+00 | −5.9869E−01 | 1.2418E−01 |
| S4 | 4.0830E+00 | −3.8894E+00 | 1.8399E+00 | −3.5345E−01 |
| S5 | 1.2953E+01 | −1.2495E+01 | 6.8165E+00 | −1.6531E+00 |
| S6 | −2.8190E−02 | −1.4898E+00 | 2.0371E+00 | −8.5328E−01 |
| S7 | 1.9701E+01 | −2.0475E+01 | 1.2167E+01 | −3.1357E+00 |
| S8 | 1.4391E+00 | −1.5804E+00 | 9.1257E−01 | −2.1537E−01 |
| S9 | 1.3090E+00 | 2.8265E−01 | −7.3148E−01 | 2.4989E−01 |
| S10 | 1.2004E+00 | −3.2259E−01 | −3.1420E−02 | 2.5968E−02 |
| S11 | −1.6350E+00 | 1.0193E+00 | −3.1513E−01 | 3.7351E−02 |
| S12 | −1.7403E+00 | 9.0187E−01 | −2.5102E−01 | 2.8832E−02 |
| S13 | −9.7715E−01 | 4.4106E−01 | −1.1164E−01 | 1.2205E−02 |
| S14 | 1.3713E−01 | −3.6080E−02 | 5.2240E−03 | −3.2000E−04 |
| S15 | 9.0450E−03 | −1.4800E−03 | 1.2800E−04 | −4.5000E−06 |
| S16 | 1.2860E−03 | −1.6000E−04 | 1.1800E−05 | −3.8000E−07 |

Table 27 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 9.

TABLE 27

| | | | |
|---|---:|---|---:|
| f1 (mm) | 3.86 | f7 (mm) | 3.22 |
| f2 (mm) | −12.27 | f8 (mm) | −1.98 |
| f3 (mm) | −25.53 | f (mm) | 3.90 |
| f4 (mm) | 8.40 | TTL (mm) | 4.85 |
| f5 (mm) | 156.07 | ImgH (mm) | 2.93 |
| f6 (mm) | −22.67 | FOV (°) | 72.7 |

Figure 18A:
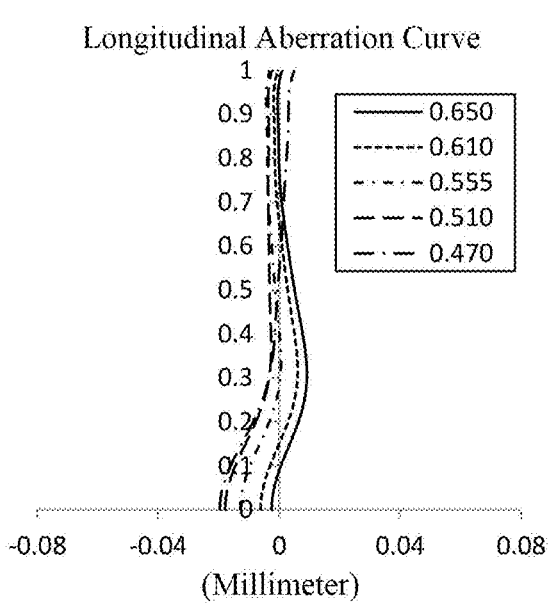
FIGS. 18A to 18D illustrate a longitudinal aberration curve, an astigmatic curve, a distortion curve and a lateral color curve of the optical imaging lens assembly of the Example 9, respectively.
Figure 18B:
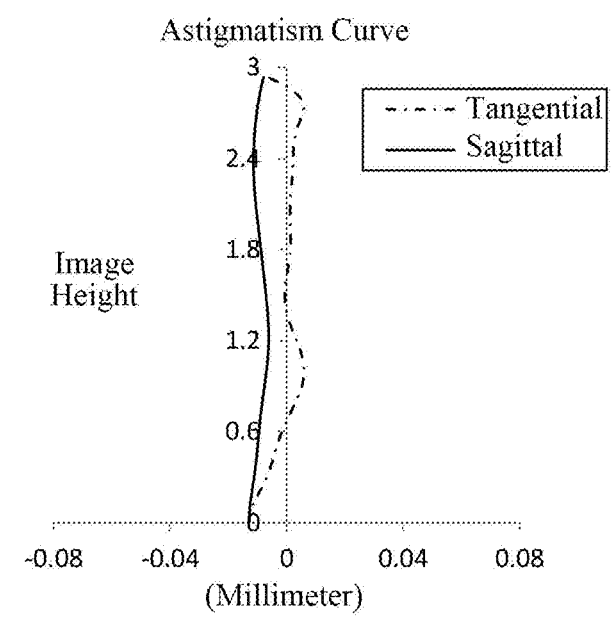
Figure 18C:
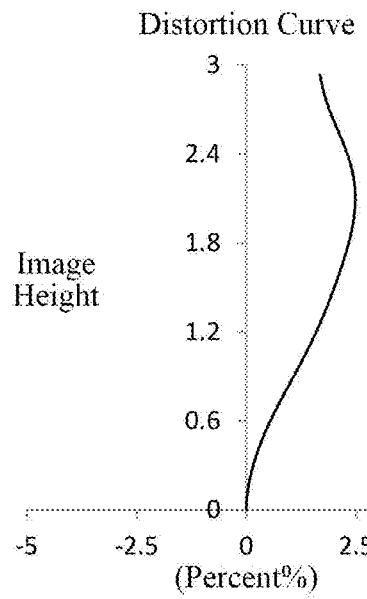
Figure 18D:
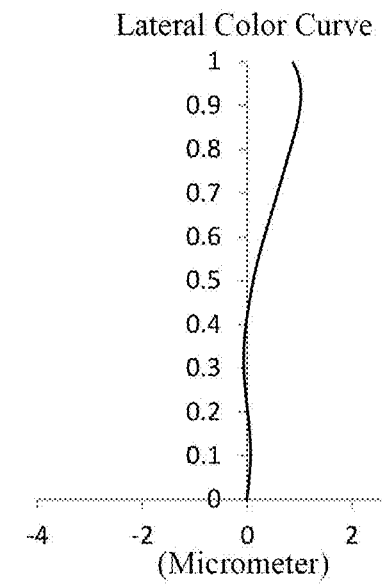

FIG. 18A illustrates a longitudinal aberration curve of the optical imaging lens assembly according to example 9, representing deviations of focal points converged by light of different wavelengths after passing through the optical imaging lens assembly. FIG. 18B illustrates an astigmatism curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion at different field of view. FIG. 18D illustrates a lateral color curve of the optical imaging lens assembly according to example 9, representing deviations of different image heights on an imaging plane after light passes through the optical imaging lens assembly. It can be seen from FIG. 18A to FIG. 18D that the optical imaging lens assembly provided in example 9 may achieve good image quality.

Example 10

Figure 19:
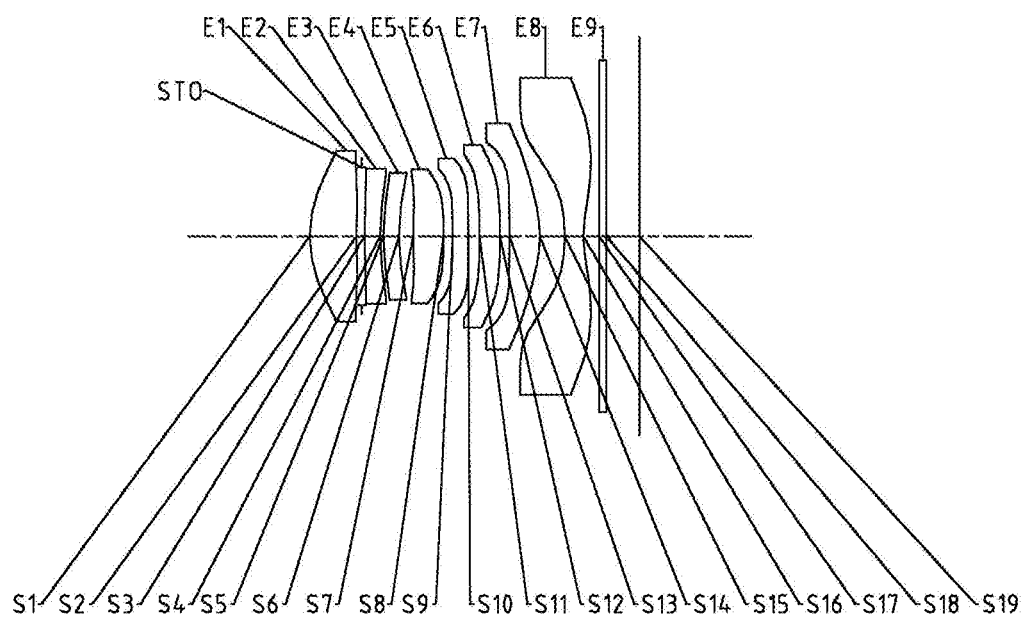
FIG. 19 illustrates a schematic structural view of an optical imaging lens assembly according to Example 10 of the present disclosure.

An optical imaging lens assembly according to example 10 of the present disclosure is described below with reference to FIG. 19 to FIG. 20D. FIG. 19 is a schematic structural view of the optical imaging lens assembly according to example 10 of the present disclosure.

As shown in FIG. 19, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a concave surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 28 shows surface type, radius of curvature, thickness, material and conic coefficient of each lens of the optical imaging lens assembly in example 10, wherein the units for the radius of curvature and the thickness are millimeter (mm).

TABLE 28

| Surface number | Surface type | Radius of curvature | Thickness | Material Refractive index | Material Abbe number | Conic coefficient |
|---|---|---:|---:|---:|---:|---:|
| OBJ | spherical | infinite | infinite | | | |
| S1 | aspheric | 1.8571 | 0.6894 | 1.55 | 56.1 | −0.1185 |
| S2 | aspheric | 12.1686 | 0.0776 | | | −2.4237 |
| STO | spherical | infinite | 0.0400 | | | |
| S3 | aspheric | 11.0595 | 0.2300 | 1.67 | 20.4 | 16.8044 |
| S4 | aspheric | 3.9328 | 0.0473 | | | −7.7589 |
| S5 | aspheric | 3.4032 | 0.2300 | 1.67 | 20.4 | −14.5382 |
| S6 | aspheric | 3.3358 | 0.2117 | | | −2.9412 |
| S7 | aspheric | 8.8654 | 0.4489 | 1.55 | 56.1 | 63.9173 |
| S8 | aspheric | −9.2581 | 0.1321 | | | 70.7382 |
| S9 | aspheric | 32.7910 | 0.2302 | 1.67 | 20.4 | −99.0000 |
| S10 | aspheric | 13.3388 | 0.1659 | | | 11.9305 |
| S11 | aspheric | −368.6720 | 0.2999 | 1.67 | 20.4 | −99.0000 |
| S12 | aspheric | 3525.7280 | 0.1434 | | | −99.0000 |
| S13 | aspheric | −18634.0000 | 0.4460 | 1.55 | 56.1 | 99.0000 |
| S14 | aspheric | −1.7949 | 0.3663 | | | −12.3815 |
| S15 | aspheric | −3.3200 | 0.2748 | 1.54 | 55.7 | −1.1266 |
| S16 | aspheric | 1.6106 | 0.2317 | | | −11.3881 |
| S17 | spherical | infinite | 0.1100 | 1.52 | 64.2 | |
| S18 | spherical | infinite | 0.4845 | | | |
| S19 | spherical | infinite | | | | |

As can be seen from Table 28, in example 10, the object-side surface and the image-side surface of any one of the first lens E1 to the eighth lens E8 are aspheric. Table 29 shows high-order coefficients applicable to each aspheric surface in example 10, wherein the surface shape of each aspheric surface may be defined by the formula (1) given in the above example 1.

TABLE 29

| Surface number | A4 | A6 | A8 | A10 | A12 |
|---|---:|---:|---:|---:|---:|
| S1 | −8.7700E−03 | −5.3000E−03 | −2.9100E−03 | −2.5900E−03 | 2.0650E−03 |
| S2 | −6.0190E−02 | −4.5200E−03 | 1.0781E−01 | −1.9085E−01 | 1.7822E−01 |
| S3 | −6.1870E−02 | −6.2030E−02 | 4.4817E−01 | −9.9330E−01 | 1.5044E+00 |
| S4 | 3.9154E−02 | −3.4774E−01 | 9.2213E−01 | −1.9643E+00 | 3.4769E+00 |

TABLE 29-continued

| | | | | |
|---|---|---|---|---|
| S5 | 7.0249E−02 | −2.7095E−01 | 3.2605E−01 | −2.7031E−01 | −2.0632E−01 |
| S6 | −2.4490E−02 | 3.8308E−02 | −3.2285E−01 | 1.4964E+00 | −4.9643E+00 |
| S7 | −1.0366E−01 | 1.2711E−01 | −1.1225E+00 | 4.8751E+00 | −1.3559E+01 |
| S8 | −1.7012E−01 | 5.2909E−02 | −5.1906E−01 | 1.5278E+00 | −2.5063E+00 |
| S9 | −2.2550E−01 | 2.4473E−01 | −1.1699E+00 | 2.3289E+00 | −1.8578E+00 |
| S10 | −2.1791E−01 | 5.1240E−01 | −1.5638E+00 | 2.8925E+00 | −3.1560E+00 |
| S11 | −2.4916E−01 | 5.1136E−01 | −9.0429E−01 | 9.7534E−01 | −4.1707E−01 |
| S12 | −1.9660E−01 | 2.2029E−01 | −2.8091E−01 | 1.8195E−01 | 8.3080E−02 |
| S13 | −3.5000E−03 | −7.2620E−02 | −1.0360E−02 | 9.7655E−02 | −8.7200E−02 |
| S14 | −4.1620E−02 | 1.1921E−01 | −3.0604E−01 | 4.3746E−01 | −3.5695E−01 |
| S15 | −2.3748E−01 | 1.5875E−01 | −8.7620E−02 | 5.7550E−02 | −2.4840E−02 |
| S16 | −1.5542E−01 | 1.2310E−01 | −7.2270E−02 | 3.0362E−02 | −8.9700E−03 |

| Surface number | A14 | A16 | A18 | A20 |
|---|---|---|---|---|
| S1 | −1.9800E−03 | 2.8300E−04 | 1.7000E−04 | −4.3000E−05 |
| S2 | −1.0166E−01 | 3.4567E−02 | −6.2700E−03 | 4.4200E−04 |
| S3 | −1.6761E+00 | 1.2929E+00 | −5.9450E−01 | 1.2046E−01 |
| S4 | −4.7198E+00 | 4.5210E+00 | −2.5801E+00 | 6.5825E−01 |
| S5 | 1.2333E+00 | −1.7259E+00 | 1.1772E+00 | −3.3950E−01 |
| S6 | 1.0449E+01 | −1.2974E+01 | 8.8060E+00 | −2.5179E+00 |
| S7 | 2.3684E+01 | −2.5329E+01 | 1.5235E+01 | −3.9248E+00 |
| S8 | 2.5767E+00 | −1.6599E+00 | 6.3692E−01 | −1.1493E−01 |
| S9 | −8.1885E−01 | 2.8802E+00 | −2.1761E+00 | 5.6614E−01 |
| S10 | 1.8131E+00 | −3.5358E−01 | −1.1779E−01 | 5.0780E−02 |
| S11 | −2.6110E−01 | 3.5607E−01 | −1.3051E−01 | 1.5088E−02 |
| S12 | −2.4470E−01 | 1.7675E−01 | −5.6220E−02 | 6.7790E−03 |
| S13 | 1.1010E−02 | 1.9952E−02 | −1.0680E−02 | 1.7490E−03 |
| S14 | 1.7208E−01 | −4.8670E−02 | 7.4850E−03 | −4.8000E−04 |
| S15 | 5.7600E−03 | −6.2000E−04 | 1.1800E−05 | 1.9000E−06 |
| S16 | 1.7930E−03 | −2.3000E−04 | 1.7000E−05 | −5.5000E−07 |

Table 30 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 10.

TABLE 30

| f1 (mm) | 3.92 | f7 (mm) | 3.29 |
|---|---|---|---|
| f2 (mm) | −9.29 | f8 (mm) | −1.98 |
| f3 (mm) | 697.44 | f (mm) | 3.98 |
| f4 (mm) | 8.37 | TTL (mm) | 4.86 |
| f5 (mm) | −33.94 | ImgH (mm) | 2.93 |
| f6 (mm) | −501.35 | FOV (°) | 71.6 |

Figure 20A:
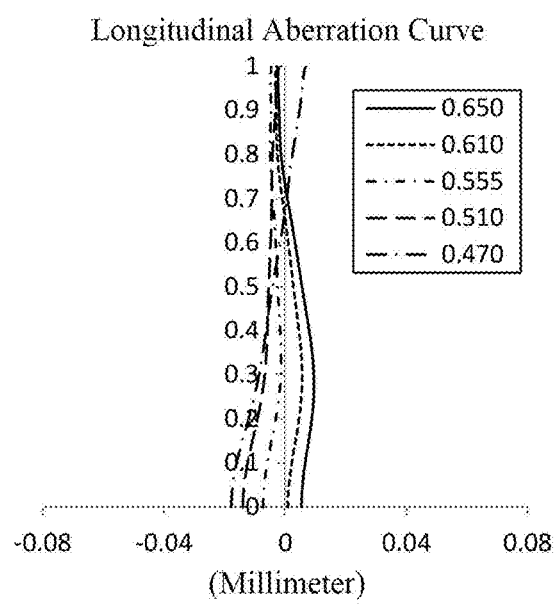
FIGS. 20A to 20D illustrate a longitudinal aberration curve, an astigmatic curve, a distortion curve and a lateral color curve of the optical imaging lens assembly of the Example 10, respectively.
Figure 20B:
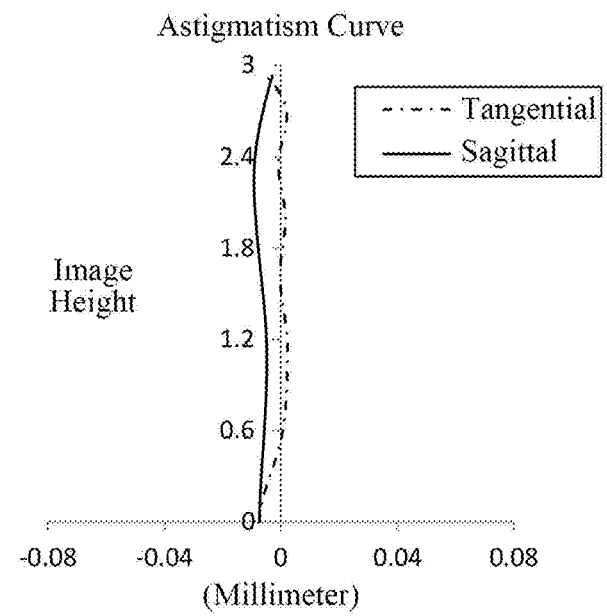
Figure 20C:
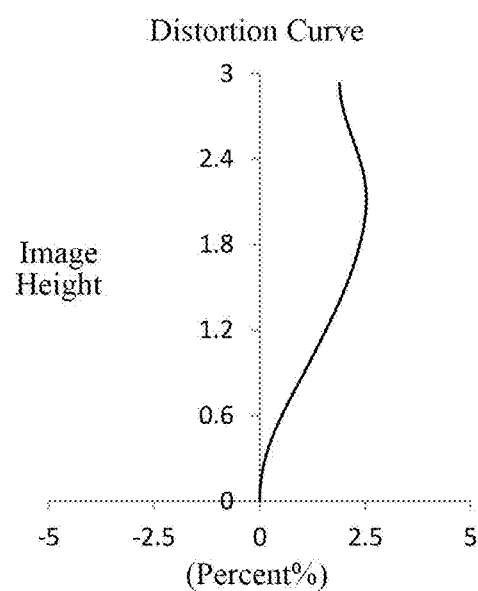
Figure 20D:
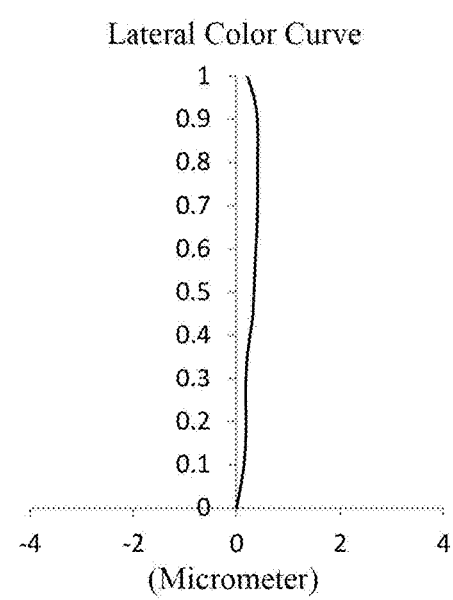

FIG. 20A illustrates a longitudinal aberration curve of the optical imaging lens assembly according to example 10, representing deviations of focal points converged by light of different wavelengths after passing through the optical imaging lens assembly. FIG. 20B illustrates an astigmatism curve of the optical imaging lens assembly according to example 10, representing a curvature of a tangential plane and a curvature of a sagittal plane. FIG. 20C illustrates a distortion curve of the optical imaging lens assembly according to example 10, representing amounts of distortion at different field of view. FIG. 20D illustrates a lateral color curve of the optical imaging lens assembly according to example 10, representing deviations of different image heights on an imaging plane after light passes through the optical imaging lens assembly. It can be seen from FIG. 20A to FIG. 20D that the optical imaging lens assembly provided in example 10 may achieve good image quality.

Example 11

Figure 21:
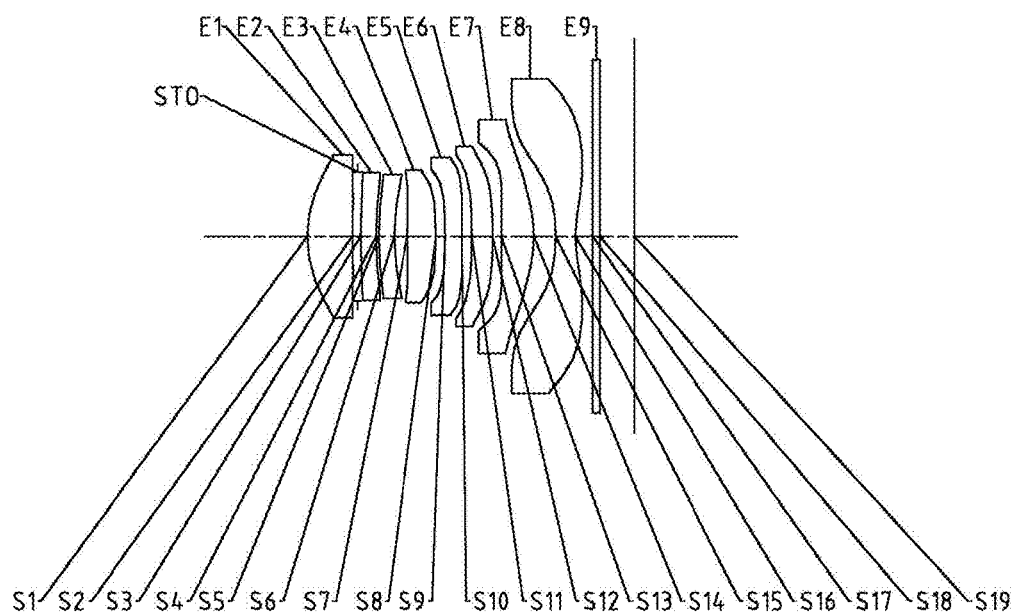
FIG. 21 illustrates a schematic structural view of an optical imaging lens assembly according to Example 11 of the present disclosure.

An optical imaging lens assembly according to example 11 of the present disclosure is described below with reference to FIG. 21 to FIG. 22D. FIG. 21 is a schematic structural view of the optical imaging lens assembly according to example 11 of the present disclosure.

As shown in FIG. 21, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 31 shows surface type, radius of curvature, thickness, material and conic coefficient of each lens of the optical imaging lens assembly in example 11, wherein the units for the radius of curvature and the thickness are millimeter (mm).

TABLE 31

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.8234 | 0.6684 | 1.55 | 56.1 | −0.0970 |
| S2 | aspheric | 10.3269 | 0.0802 | | | −9.5276 |
| STO | spherical | infinite | 0.0400 | | | |
| S3 | aspheric | 7.3621 | 0.2300 | 1.67 | 20.4 | −6.9715 |
| S4 | aspheric | 5.6968 | 0.0400 | | | −1.5945 |
| S5 | aspheric | 5.0067 | 0.2300 | 1.67 | 20.4 | −10.5676 |
| S6 | aspheric | 3.1652 | 0.2011 | | | −3.4234 |
| S7 | aspheric | 8.6783 | 0.4254 | 1.55 | 56.1 | 67.7174 |
| S8 | aspheric | −10.3601 | 0.1354 | | | 57.1242 |
| S9 | aspheric | 289.9099 | 0.2492 | 1.67 | 20.4 | −99.0000 |
| S10 | aspheric | 9.1444 | 0.1476 | | | 39.4012 |
| S11 | aspheric | −35.0143 | 0.3073 | 1.67 | 20.4 | 76.2637 |
| S12 | aspheric | −33.9758 | 0.1309 | | | 98.5017 |
| S13 | aspheric | 10.8803 | 0.4824 | 1.55 | 56.1 | 34.0865 |
| S14 | aspheric | −1.8716 | 0.3236 | | | −10.1296 |
| S15 | aspheric | −3.4909 | 0.2907 | 1.54 | 55.7 | −1.0522 |
| S16 | aspheric | 1.5974 | 0.2575 | | | −12.9506 |
| S17 | spherical | infinite | 0.1100 | 1.52 | 64.2 | |
| S18 | spherical | infinite | 0.5103 | | | |
| S19 | spherical | infinite | | | | |

As can be seen from Table 31, in example 11, the object-side surface and the image-side surface of any one of the first lens E1 to the eighth lens E8 are aspheric. Table 32 shows high-order coefficients applicable to each aspheric surface in example 11, wherein the surface shape of each aspheric surface may be defined by the formula (1) given in the above example 1.

TABLE 32

| Surface number | A4 | A6 | A8 | A10 | A12 |
|---|---|---|---|---|---|
| S1 | −9.2200E−03 | −1.6100E−03 | −1.1300E−02 | 1.3980E−02 | −1.5370E−02 |
| S2 | −6.8020E−02 | −7.8100E−03 | 1.8093E−01 | −3.9788E−01 | 5.2690E−01 |
| S3 | −6.8770E−02 | −6.1520E−02 | 3.0348E−01 | −1.8241E−01 | −6.0919E−01 |
| S4 | 1.1719E−01 | −5.4268E−01 | 2.9524E−01 | 3.0636E+00 | −1.1560E+01 |
| S5 | 1.5221E−01 | −5.6155E−01 | 3.7652E−01 | 1.6866E+00 | −6.2806E+00 |
| S6 | 7.5500E−04 | −1.5170E−02 | −5.5678E−01 | 3.2082E+00 | −1.0254E+01 |
| S7 | −8.4140E−02 | 4.4821E−02 | −7.5973E−01 | 3.6118E+00 | −1.1246E+01 |
| S8 | −1.3740E−01 | 2.9382E−02 | −3.0494E−01 | 4.5214E−01 | −1.4253E−01 |
| S9 | −2.0454E−01 | 9.9659E−02 | 1.0635E−01 | −1.8961E+00 | 5.9034E+00 |
| S10 | −2.0003E−01 | 1.6143E−01 | 1.6255E−01 | −1.3898E+00 | 3.2128E+00 |
| S11 | −1.3437E−01 | −1.5542E−01 | 1.2703E+00 | −3.4890E+00 | 5.4241E+00 |
| S12 | −9.7270E−02 | −4.1468E−01 | 1.6538E+00 | −3.3116E+00 | 4.0135E+00 |
| S13 | 7.1210E−03 | −4.5609E−01 | 1.1655E+00 | −1.7919E+00 | 1.7355E+00 |
| S14 | 2.3807E−02 | −1.1180E−01 | 1.5723E−01 | −1.1233E−01 | 3.7172E−02 |
| S15 | −2.6466E−01 | 2.3526E−01 | −1.7101E−01 | 1.0645E−01 | −4.2150E−02 |
| S16 | −1.4714E−01 | 1.1724E−01 | −7.1870E−02 | 3.1221E−02 | −9.4300E−03 |

| Surface number | A14 | A16 | A18 | A20 |
|---|---|---|---|---|
| S1 | 7.4460E−03 | −4.7000E−04 | −1.4700E−03 | 4.4400E−04 |
| S2 | −4.8015E−01 | 2.8706E−01 | −9.9890E−02 | 1.5178E−02 |
| S3 | 1.5830E+00 | −1.8014E+00 | 1.0909E+00 | −2.8040E−01 |
| S4 | 2.1847E+01 | −2.4555E+01 | 1.5624E+01 | −4.2701E+00 |
| S5 | 1.1588E+01 | −1.3401E+01 | 9.2781E+00 | −2.8420E+00 |
| S6 | 2.0493E+01 | −2.5207E+01 | 1.7389E+01 | −5.0803E+00 |
| S7 | 2.2262E+01 | −2.7111E+01 | 1.8417E+01 | −5.2379E+00 |
| S8 | −5.1236E−01 | 8.7871E−01 | −5.9594E−01 | 1.6338E−01 |
| S9 | −9.5550E+00 | 8.7885E+00 | −4.3122E+00 | 8.5671E−01 |
| S10 | −4.0182E+00 | 2.8634E+00 | −1.0994E+00 | 1.7780E−01 |
| S11 | −5.0946E+00 | 2.8155E+00 | −8.3535E−01 | 1.0220E−01 |
| S12 | −3.0440E+00 | 1.4090E+00 | −3.6208E−01 | 3.9422E−02 |
| S13 | −1.0884E+00 | 4.2773E−01 | −9.5610E−02 | 9.3290E−03 |
| S14 | −4.3000E−04 | −3.3400E−03 | 8.8600E−04 | −7.4000E−05 |
| S15 | 9.6690E−03 | −1.2000E−03 | 6.7400E−05 | −7.3000E−07 |
| S16 | 1.9080E−03 | −2.5000E−04 | 1.8300E−05 | −6.0000E−07 |

Table 33 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 11.

TABLE 33

| f1 (mm) | 3.95 | f7 (mm) | 2.96 |
|---|---|---|---|
| f2 (mm) | −40.04 | f8 (mm) | −2.00 |
| f3 (mm) | −13.61 | f (mm) | 4.04 |
| f4 (mm) | 8.72 | TTL (mm) | 4.86 |
| f5 (mm) | −14.19 | ImgH (mm) | 2.93 |
| f6 (mm) | 1538.71 | FOV (°) | 70.6 |

Figures 22A, 22B:
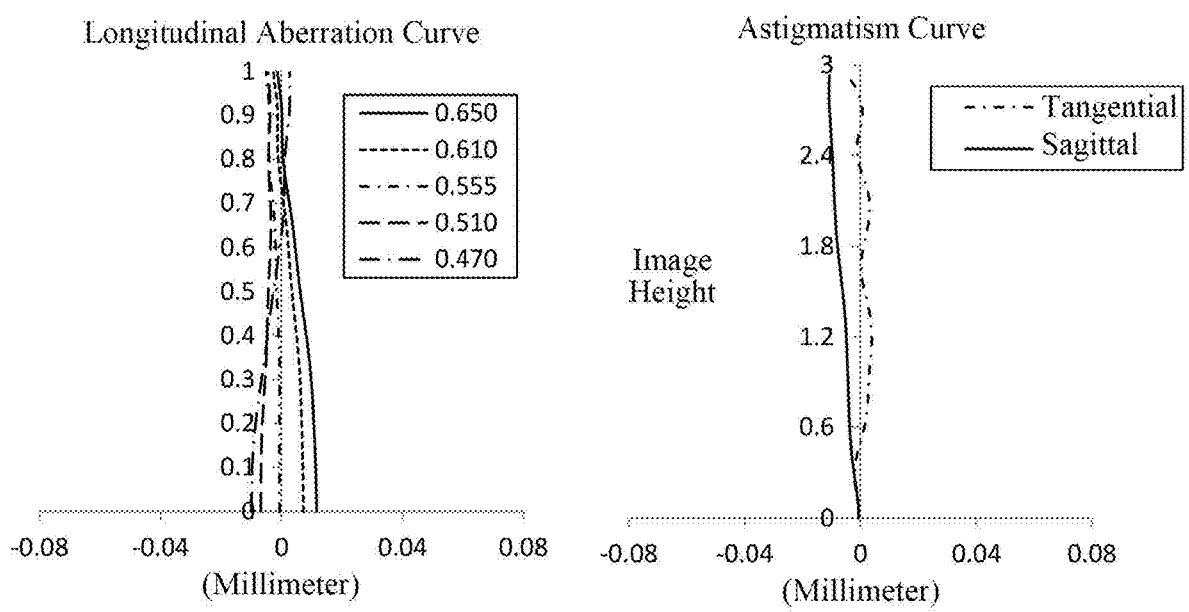
FIGS. 22A to 22D illustrate a longitudinal aberration curve, an astigmatic curve, a distortion curve and a lateral color curve of the optical imaging lens assembly of the Example 11, respectively.
Figure 22C:
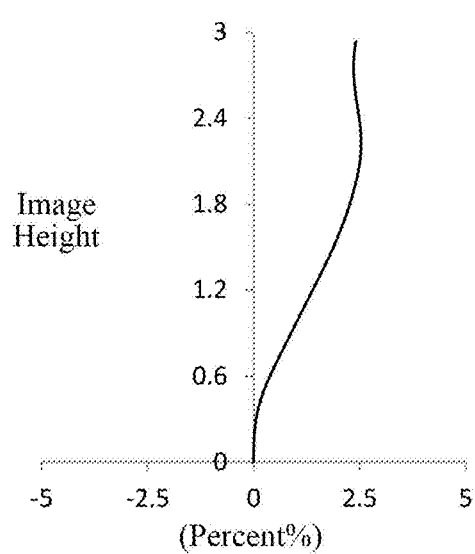
Figure 22D:
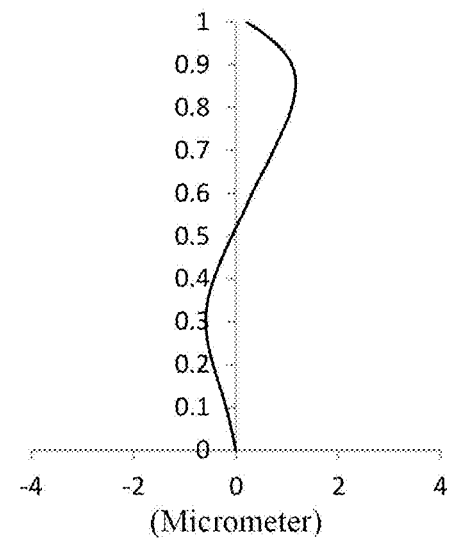

FIG. 22A illustrates a longitudinal aberration curve of the optical imaging lens assembly according to example 11, representing deviations of focal points converged by light of different wavelengths after passing through the optical imaging lens assembly. FIG. 22B illustrates an astigmatism curve of the optical imaging lens assembly according to example 11, representing a curvature of a tangential plane and a curvature of a sagittal plane. FIG. 22C illustrates a distortion curve of the optical imaging lens assembly according to example 11, representing amounts of distortion at different field of view. FIG. 22D illustrates a lateral color curve of the optical imaging lens assembly according to example 11, representing deviations of different image heights on an imaging plane after light passes through the optical imaging lens assembly. It can be seen from FIG. 22A to FIG. 22D that the optical imaging lens assembly provided in example 11 may achieve good image quality.

Example 12

Figure 23:
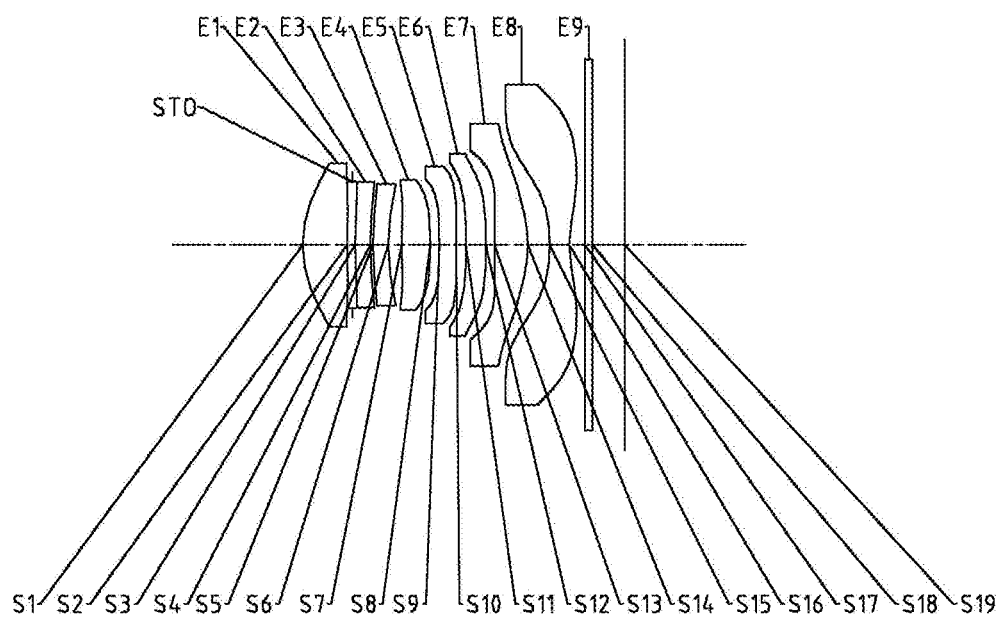
FIG. 23 illustrates a schematic structural view of an optical imaging lens assembly according to Example 12 of the present disclosure.

An optical imaging lens assembly according to example 12 of the present disclosure is described below with reference to FIG. 23 to FIG. 24D. FIG. 23 is a schematic structural view of the optical imaging lens assembly according to example 12 of the present disclosure.

As shown in FIG. 23, the optical imaging lens assembly according to an exemplary embodiment of the present disclosure includes a first lens E1, a diaphragm STO, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 34 shows surface type, radius of curvature, thickness, material and conic coefficient of each lens of the optical imaging lens assembly in example 12, wherein the units for the radius of curvature and the thickness are millimeter (mm).

TABLE 34

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8255 | 0.6708 | 1.55 | 56.1 | −0.0956 |
| S2 | aspheric | 10.8819 | 0.0790 | | | −11.0929 |
| STO | spherical | infinite | 0.0400 | | | |
| S3 | aspheric | 7.1848 | 0.2300 | 1.67 | 20.4 | −7.9735 |
| S4 | aspheric | 6.2945 | 0.0400 | | | −0.6578 |
| S5 | aspheric | 5.5664 | 0.2300 | 1.67 | 20.4 | −11.7402 |
| S6 | aspheric | 3.1164 | 0.2039 | | | −3.2645 |
| S7 | aspheric | 8.7232 | 0.4317 | 1.55 | 56.1 | 67.6218 |
| S8 | aspheric | −9.9208 | 0.1367 | | | 58.9919 |
| S9 | aspheric | −1245.0800 | 0.2527 | 1.67 | 20.4 | −99.0000 |
| S10 | aspheric | 9.4497 | 0.1471 | | | 40.1345 |
| S11 | aspheric | −41.4692 | 0.3003 | 1.67 | 20.4 | −99.0000 |
| S12 | aspheric | −39.3965 | 0.1314 | | | 1.2087 |
| S13 | aspheric | 11.0956 | 0.5020 | 1.55 | 56.1 | 33.1875 |
| S14 | aspheric | −1.8839 | 0.3301 | | | −9.8945 |
| S15 | aspheric | −3.4589 | 0.2965 | 1.54 | 55.7 | −1.0356 |
| S16 | aspheric | 1.5919 | 0.2375 | | | −12.5700 |
| S17 | spherical | infinite | 0.1100 | 1.52 | 64.2 | |
| S18 | spherical | infinite | 0.4903 | | | |
| S19 | spherical | infinite | | | | |

As can be seen from Table 34, in example 12, the object-side surface and the image-side surface of any one of the first lens E1 to the eighth lens E8 are aspheric. Table 35 shows high-order coefficients applicable to each aspheric surface in example 12, wherein the surface shape of each aspheric surface may be defined by the formula (1) given in the above example 1.

TABLE 35

| Surface number | A4 | A6 | A8 | A10 | A12 |
|---|---|---|---|---|---|
| S1 | −8.7800E−03 | −4.1000E−04 | −1.8520E−02 | 3.5760E−02 | −5.2230E−02 |
| S2 | −6.9520E−02 | 3.5200E−04 | 1.4440E−01 | −2.8157E−01 | 2.9909E−01 |
| S3 | −7.1560E−02 | −5.2400E−02 | 2.2030E−01 | 2.3079E−01 | −1.6922E+00 |
| S4 | 1.2647E−01 | −6.3588E−01 | 6.8617E−01 | 2.0170E+00 | −9.3620E+00 |

TABLE 35-continued

| | | | | |
|---|---|---|---|---|
| S5 | 1.6329E−01 | −6.5931E−01 | 6.9239E−01 | 1.2342E+00 | −6.2992E+00 |
| S6 | 7.5320E−03 | −7.8800E−02 | −2.2407E−01 | 2.0425E+00 | −7.3765E+00 |
| S7 | −8.5430E−02 | 9.0485E−02 | −1.1515E+00 | 5.4765E+00 | −1.6458E+01 |
| S8 | −1.3645E−01 | −6.2700E−03 | −5.8250E−02 | −4.2556E−01 | 1.7819E+00 |
| S9 | −2.0911E−01 | 1.2208E−01 | −1.2399E−01 | −6.4782E−01 | 2.2640E+00 |
| S10 | −1.9488E−01 | 1.2200E−01 | 2.9174E−01 | −1.5322E+00 | 3.1168E+00 |
| S11 | −1.3331E−01 | −1.5754E−01 | 1.1851E+00 | −3.0244E+00 | 4.3842E+00 |
| S12 | −1.0292E−01 | −3.6002E−01 | 1.4172E+00 | −2.7378E+00 | 3.1900E+00 |
| S13 | −3.9500E−03 | −3.7505E−01 | 9.0541E−01 | −1.2989E+00 | 1.1596E+00 |
| S14 | 2.0892E−02 | −9.3180E−02 | 1.1467E−01 | −6.4260E−02 | 7.3930E−03 |
| S15 | −2.5815E−01 | 2.3589E−01 | −1.8491E−01 | 1.2401E−01 | −5.3790E−02 |
| S16 | −1.4353E−01 | 1.1460E−01 | −7.1140E−02 | 3.1477E−02 | −9.7100E−03 |

| Surface number | A14 | A16 | A18 | A20 |
|---|---|---|---|---|
| S1 | 4.4359E−02 | −2.2280E−02 | 5.4530E−03 | −4.6000E−04 |
| S2 | −2.1193E−01 | 1.0034E−01 | −2.8900E−02 | 3.8130E−03 |
| S3 | 3.2128E+00 | −3.2022E+00 | 1.7201E+00 | −3.9146E−01 |
| S4 | 1.8107E+01 | −1.9851E+01 | 1.1998E+01 | −3.0527E+00 |
| S5 | 1.2678E+01 | −1.4843E+01 | 9.8272E+00 | −2.7892E+00 |
| S6 | 1.5633E+01 | −1.9750E+01 | 1.3666E+01 | −3.9300E+00 |
| S7 | 3.0955E+01 | −3.5423E+01 | 2.2474E+01 | −5.9752E+00 |
| S8 | −3.2365E+00 | 3.3402E+00 | −1.8995E+00 | 4.7013E−01 |
| S9 | −3.4882E+00 | 2.9632E+00 | −1.3100E+00 | 2.1323E−01 |
| S10 | −3.6279E+00 | 2.4733E+00 | −9.2486E−01 | 1.4763E−01 |
| S11 | −3.8665E+00 | 2.0151E+00 | −5.6402E−01 | 6.5018E−02 |
| S12 | −2.3315E+00 | 1.0446E+00 | −2.6080E−01 | 2.7657E−02 |
| S13 | −6.6754E−01 | 2.4059E−01 | −4.9390E−02 | 4.4610E−03 |
| S14 | 9.8760E−03 | −5.2300E−03 | 1.0380E−03 | −7.6000E−05 |
| S15 | 1.4225E−02 | −2.2500E−03 | 1.9600E−04 | −7.4000E−06 |
| S16 | 2.0130E−03 | −2.7000E−04 | 2.0200E−05 | −6.7000E−07 |

Table 36 shows effective focal lengths f1 to f8 of respective lens, a total effective focal length f of the optical imaging lens assembly, a distance TTL on the optical axis from a center of the object-side surface S1 of the first lens E1 to the imaging plane S19, half of a diagonal length ImgH of an effective pixel area on the imaging plane S19 and a full field-of-view FOV of the optical imaging lens assembly in example 12.

TABLE 36

| f1 (mm) | 3.92 | f7 (mm) | 2.99 |
|---|---|---|---|
| f2 (mm) | −85.08 | f8 (mm) | −1.99 |
| f3 (mm) | −11.05 | f (mm) | 4.01 |
| f4 (mm) | 8.57 | TTL (mm) | 4.86 |
| f5 (mm) | −14.09 | ImgH (mm) | 3.10 |
| f6 (mm) | 1119.19 | FOV (°) | 74.0 |

Figure 24A:
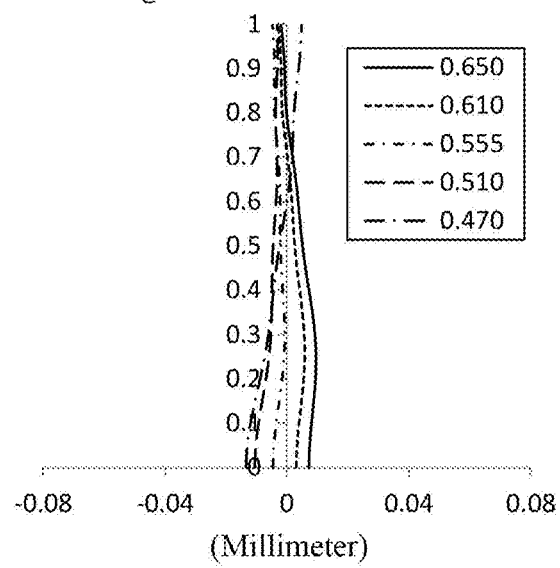
FIGS. 24A to 24D illustrate a longitudinal aberration curve, an astigmatic curve, a distortion curve and a lateral color curve of the optical imaging lens assembly of the Example 12, respectively.
Figure 24B:
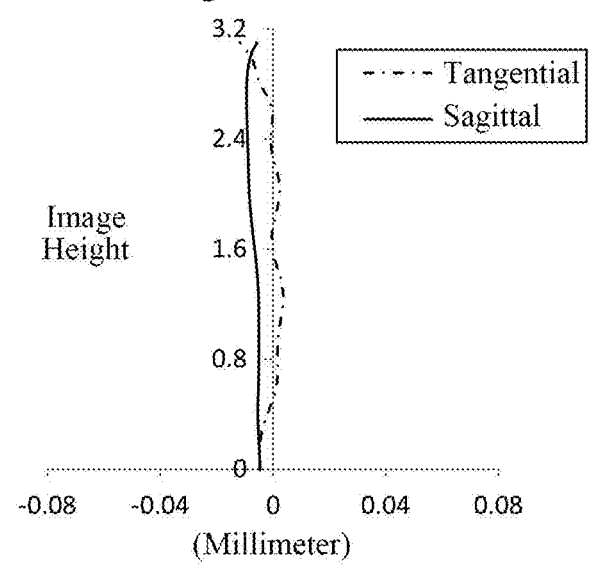
Figure 24C:
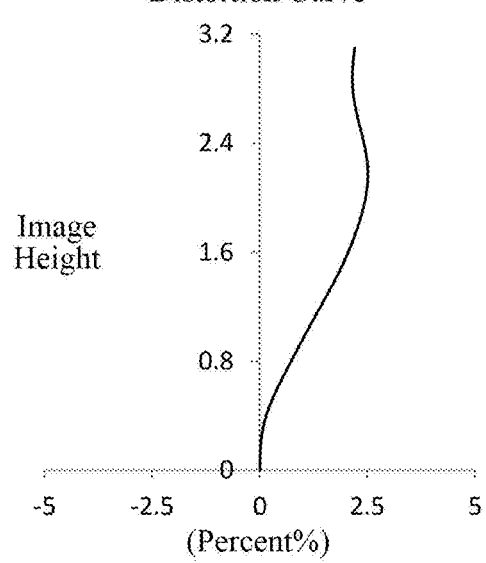
Figure 24D:
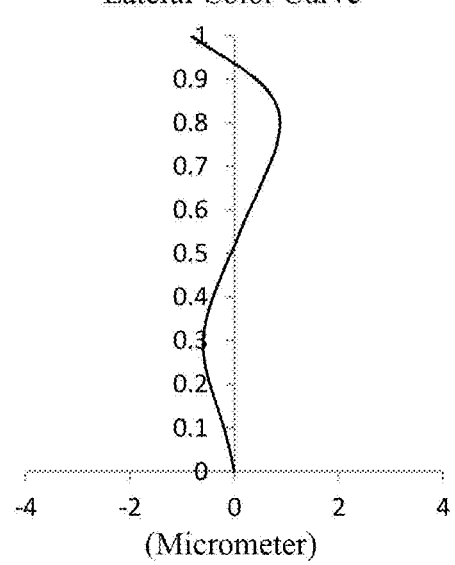

FIG. 24A illustrates a longitudinal aberration curve of the optical imaging lens assembly according to example 12, representing deviations of focal points converged by light of different wavelengths after passing through the optical imaging lens assembly. FIG. 24B illustrates an astigmatism curve of the optical imaging lens assembly according to example 12, representing a curvature of a tangential plane and a curvature of a sagittal plane. FIG. 24C illustrates a distortion curve of the optical imaging lens assembly according to example 12, representing amounts of distortion at different field of view. FIG. 24D illustrates a lateral color curve of the optical imaging lens assembly according to example 12, representing deviations of different image heights on an imaging plane after light passes through the optical imaging lens assembly. It can be seen from FIG. 24A to FIG. 24D that the optical imaging lens assembly provided in example 12 may achieve good image quality.

In view of the above, examples 1 to 12 respectively satisfy the relationship shown in Table 37.

TABLE 37

| | Example | | | | | | | | | | | |
|---|---|---|---|---|---|---|---|---|---|---|---|---|
| Condition | 1 | 2 | 3 | 4 | 5 | 6 | 7 | 8 | 9 | 10 | 11 | 12 |
| f/EPD | 1.61 | 1.91 | 1.85 | 1.78 | 1.92 | 1.70 | 1.70 | 1.80 | 1.80 | 1.80 | 1.93 | 1.91 |
| TTL/ImgH | 1.55 | 1.54 | 1.47 | 1.65 | 1.48 | 1.65 | 1.65 | 1.65 | 1.65 | 1.66 | 1.66 | 1.57 |
| FOV (°) | 75.9 | 74.8 | 78.2 | 71.7 | 77.1 | 72.6 | 72.3 | 73.1 | 72.7 | 71.6 | 70.6 | 74.0 |
| f1/f | 1.07 | 0.97 | 1.01 | 1.03 | 0.99 | 0.99 | 0.97 | 0.99 | 0.99 | 0.98 | 0.98 | 0.98 |
| f/f2 | −0.28 | −0.39 | −0.44 | −0.46 | −0.40 | −0.03 | −0.28 | −0.29 | −0.32 | −0.43 | −0.10 | −0.05 |
| f7/f8 | −1.46 | −1.41 | −1.45 | −1.47 | −1.46 | −1.50 | −1.49 | −1.62 | −1.63 | −1.66 | −1.48 | −1.50 |
| R8/R7 | −2.35 | −1.49 | −1.24 | −1.08 | −1.11 | −0.98 | −1.01 | −1.10 | −1.15 | −1.04 | −1.19 | −1.14 |
| CT4/CT5 | 1.49 | 1.90 | 1.76 | 1.26 | 1.70 | 1.72 | 1.69 | 2.08 | 1.89 | 1.95 | 1.71 | 1.71 |
| f/R10 | 0.57 | 0.48 | 0.44 | 0.36 | 0.43 | 0.51 | 0.44 | 0.38 | 0.18 | 0.30 | 0.44 | 0.42 |
| T67/T78 | 0.65 | 0.48 | 0.31 | 0.41 | 0.40 | 0.57 | 0.59 | 0.36 | 0.37 | 0.39 | 0.40 | 0.40 |
| R6/R5 | 0.84 | 0.97 | 1.05 | 1.09 | 1.00 | 0.32 | 0.73 | 0.74 | 0.77 | 0.98 | 0.63 | 0.56 |
| f1/R1 | 2.25 | 2.18 | 2.16 | 2.19 | 2.18 | 2.15 | 2.08 | 1.83 | 1.89 | 2.11 | 2.16 | 2.14 |
| f/CT6 | 16.22 | 15.67 | 14.60 | 16.03 | 13.93 | 14.13 | 15.78 | 16.83 | 16.95 | 13.28 | 13.15 | 13.37 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, a sixth lens, a seventh lens and an eighth lens, which are sequentially arranged from an object side of the optical imaging lens assembly to an image side of the optical imaging lens assembly along an optical axis of the optical imaging lens assembly, wherein, the first lens has a positive refractive power;

the second lens has a negative refractive power;

the third lens has a positive refractive power or a negative refractive power;

the fourth lens has a positive refractive power, an object-side surface of the fourth lens is a convex surface and an image-side surface of the fourth lens is a convex surface;

the fifth lens has a positive refractive power or a negative refractive power, and an image-side surface of the fifth lens is a concave surface;

the sixth lens has a positive refractive power or a negative refractive power;

the seventh lens has a positive refractive power;

the eighth lens has a negative refractive power; and $0.5<f1/f<1.5$, where f1 is an effective focal length of the first lens and f is a total effective focal length of the optical imaging lens assembly.

2. The optical imaging lens assembly according to claim 1, wherein $TTL/ImgH \leq 1.70$, where TTL is a distance on the optical axis from a center of an object-side surface of the first lens to an imaging plane of the optical imaging lens assembly and ImgH is half of a diagonal length of an effective pixel area on the imaging plane of the optical imaging lens assembly.

3. The optical imaging lens assembly according to claim 1, wherein $70° \leq FOV \leq 80°$, where FOV is a full field-of-view of the optical imaging lens assembly.

4. The optical imaging lens assembly according to claim 1, wherein $-0.5<f/f2<0$, where f is the total effective focal length of the optical imaging lens assembly and f2 is an effective focal length of the second lens.

5. The optical imaging lens assembly according to claim 1, wherein $-2.0<f7/f8<-1.0$, where f7 is an effective focal length of the seventh lens and f8 is an effective focal length of the eighth lens.

6. The optical imaging lens assembly according to claim 1, wherein $-2.5<R8/R7<-0.5$, where R8 is a radius of curvature of the image-side surface of the fourth lens and R7 is a radius of curvature of the object-side surface of the fourth lens.

7. The optical imaging lens assembly according to claim 1, wherein $1.0<CT4/CT5<2.5$, where CT4 is a center thickness of the fourth lens on the optical axis and CT5 is a center thickness of the fifth lens on the optical axis.

8. The optical imaging lens assembly according to claim 1, wherein $0<f/R10<1.0$, where f is the total effective focal length of the optical imaging lens assembly and R10 is a radius of curvature of the image-side surface of the fifth lens.

9. The optical imaging lens assembly according to claim 1, wherein $0<T67/T78<1.0$, where T67 is a spaced distance between the sixth lens and the seventh lens on the optical axis and T78 is a spaced distance between the seventh lens and the eighth lens on the optical axis.

10. The optical imaging lens assembly according to claim 1, wherein $0<R6/R5<1.5$, where R6 is a radius of curvature of an image-side surface of the third lens and R5 is a radius of curvature of an object-side surface of the third lens.

11. The optical imaging lens assembly according to claim 1, wherein $1.5<f1/R1<2.5$, where f1 is the effective focal length of the first lens and R1 is a radius of curvature of an object-side surface of the first lens.

12. The optical imaging lens assembly according to claim 1, wherein $13.0<f/CT6<17.0$, where f is the total effective focal length of the optical imaging lens assembly and CT6 is a center thickness of the sixth lens on the optical axis.

13. An optical imaging lens assembly, comprising: a first lens, a second lens, a third lens, a fourth lens, a fifth lens, a sixth lens, a seventh lens and an eighth lens, which are sequentially arranged from an object side of the optical imaging lens assembly to an image side of the optical imaging lens assembly along an optical axis of the optical imaging lens assembly, wherein, the first lens has a positive refractive power;

the second lens has a negative refractive power;

each of the third lens, the fifth lens, and the sixth lens has a positive refractive power or a negative refractive power;

the fourth lens has a positive refractive power, an object-side surface of the fourth lens is a convex surface and an image-side surface of the fourth lens is a convex surface;

the seventh lens has a positive refractive power;

the eighth lens has a negative refractive power;

$f/EPD \leq 2.0$, where f is a total effective focal length of the optical imaging lens assembly, and EPD is an entrance pupil diameter of the optical imaging lens assembly; and $-2.0<f7/f8<-1.0$, where f7 is an effective focal length of the seventh lens and f8 is an effective focal length of the eighth lens.

14. The optical imaging lens assembly according to claim 13, wherein $0.5<f1/f<1.5$, where f1 is an effective focal length of the first lens and f is the total effective focal length of the optical imaging lens assembly.

15. The optical imaging lens assembly according to claim 14, wherein $1.5 < f1/R1 < 2.5$,
where f1 is the effective focal length of the first lens and R1 is a radius of curvature of an object-side surface of the first lens.

16. The optical imaging lens assembly according to claim 13, wherein $70° \leq FOV \leq 80°$,
where FOV is a full field-of-view of the optical imaging lens assembly.

17. The optical imaging lens assembly according to claim 13, wherein $TTL/ImgH \leq 1.70$,
where TTL is a distance on the optical axis from a center of an object-side surface of the first lens to an imaging plane of the optical imaging lens assembly and ImgH is half of a diagonal length of an effective pixel area on the imaging plane of the optical imaging lens assembly.

18. The optical imaging lens assembly according to claim 13, wherein $13.0 < f/CT6 < 17.0$,
where f is the total effective focal length of the optical imaging lens assembly and CT6 is a center thickness of the sixth lens on the optical axis.

* * * * *